(12) United States Patent
Ishidera

(10) Patent No.: US 8,572,392 B2
(45) Date of Patent: Oct. 29, 2013

(54) ACCESS AUTHENTICATION METHOD, INFORMATION PROCESSING UNIT, AND COMPUTER PRODUCT

(75) Inventor: Nobutaka Ishidera, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 1335 days.

(21) Appl. No.: 11/474,973

(22) Filed: Jun. 27, 2006

(65) Prior Publication Data

US 2006/0248345 A1 Nov. 2, 2006

Related U.S. Application Data

(63) Continuation of application No. PCT/JP2005/006514, filed on Apr. 1, 2005.

(30) Foreign Application Priority Data

Apr. 1, 2004 (JP) .................................. 2004-108938

(51) Int. Cl.
*H04L 29/00* (2006.01)

(52) U.S. Cl.
USPC ........... 713/183; 713/155; 713/176; 713/193; 705/41; 380/44; 380/279

(58) Field of Classification Search
USPC ........ 713/155, 176, 193; 705/41; 380/44, 279
See application file for complete search history.

(56) References Cited

U.S. PATENT DOCUMENTS

| 5,590,199 A | | 12/1996 | Krajewski et al. | |
|---|---|---|---|---|
| 5,623,637 A | * | 4/1997 | Jones et al. | 711/164 |
| 5,659,616 A | * | 8/1997 | Sudia | 705/76 |
| 5,761,309 A | * | 6/1998 | Ohashi et al. | 713/156 |
| 5,857,024 A | | 1/1999 | Nishino et al. | |
| 6,092,202 A | * | 7/2000 | Veil et al. | 726/27 |
| 6,289,324 B1 | * | 9/2001 | Kawan | 705/41 |
| 6,393,563 B1 | * | 5/2002 | Maruyama et al. | 713/155 |
| 2003/0159044 A1 | * | 8/2003 | Doyle et al. | 713/176 |
| 2003/0173400 A1 | | 9/2003 | Morita et al. | |
| 2003/0212896 A1 | * | 11/2003 | Kisliakov | 713/193 |

FOREIGN PATENT DOCUMENTS

| CN | 1 154 512 | | 7/1997 |
|---|---|---|---|
| CN | 1 274 127 | | 11/2000 |
| EP | 0 773 490 | | 5/1997 |
| EP | 1073025 | A2 * | 1/2001 |
| GB | 2 382 172 | | 5/2003 |

(Continued)

OTHER PUBLICATIONS

Office Action issued in corresponding Korean Patent Application No. 10-2006-7015158, on Oct. 30, 2007.

(Continued)

*Primary Examiner* — Jeffrey Pwu
*Assistant Examiner* — Michael D Anderson
(74) *Attorney, Agent, or Firm* — Fujitsu Patent Center

(57) ABSTRACT

An input personal identification number (PIN) is encrypted, identification information to identify a computer that has generated an encrypted PIN is associated with the encrypted PIN, and the associated information is sent to a recording medium. When the recording medium is again connected to the computer, it is checked whether the identification information is present in the recording medium. If the identification information is present in the recording medium, the encrypted PIN associated with the identification information is decrypted. These processes can be performed on both computer side and recording medium side.

29 Claims, 19 Drawing Sheets

(56) References Cited

FOREIGN PATENT DOCUMENTS

| | | |
|---|---|---|
| JP | 4-107793 | 4/1992 |
| JP | 6-115287 | 4/1994 |
| JP | 2000-90334 | 3/2000 |
| JP | 2000-090334 A | 3/2000 |
| JP | 2001-118034 | 4/2001 |
| JP | 2001-285286 | 10/2001 |
| JP | 2003346098 * | 1/2003 |
| JP | 2003-174439 | 6/2003 |
| JP | 2003-346098 | 12/2003 |
| WO | 00/42491 | 7/2000 |

OTHER PUBLICATIONS

International Search Report from corresponding PCT application PCT/JP2005/006514 w/ English language translation.

Written Opinion from corresponding PCT application PCT/JP2005/006514.

Chinese Patent Office Action, mailed Sep. 28, 2007 and issued in corresponding Chinese Patent Application No. 2005800035387.

"Japanese Office Action", Partial English Translation, mailed Sep. 15, 2009 in corresponding JP Patent App. No. 2006-511850.

* cited by examiner

FIG.10

| DATA TYPE | DATA SIZE | CONTENT |
|---|---|---|
| NUMBER OF STORED DATA | 1 byte | NUMBER OF ENCRYPTED PINS IN AREA |
| PIN INFORMATION (1) | 16 byte | CPU ID OF PC THAT ENCRYPTED PIN (1) |
| ENCRYPTED PIN (1) | 32 byte | ENCRYPTED PIN (1) |
| PIN INFORMATION (2) | 16 byte | CPU ID OF PC THAT ENCRYPTED PIN (2) |
| ENCRYPTED PIN (2) | 32 byte | ENCRYPTED PIN (2) |
| PIN INFORMATION (3) | 16 byte | CPU ID OF PC THAT ENCRYPTED PIN (3) |
| ENCRYPTED PIN (3) | 32 byte | ENCRYPTED PIN (3) |
| ⋮ REPEAT ⋮ | | |

FIG.11
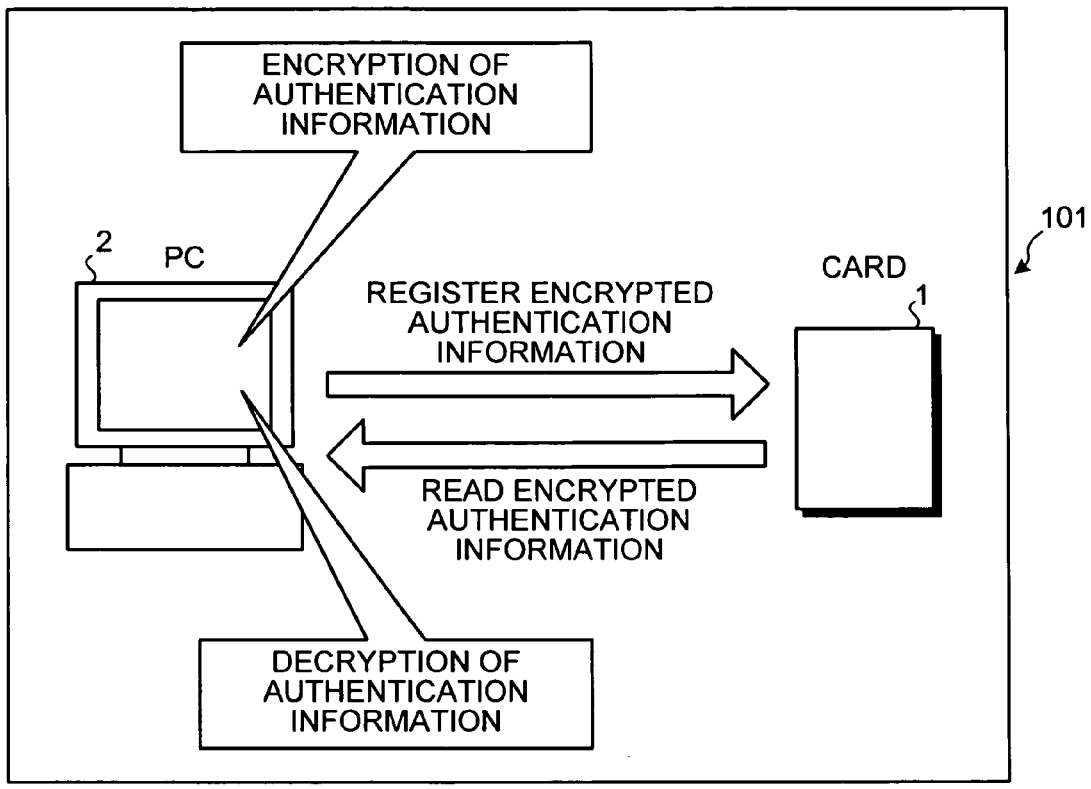
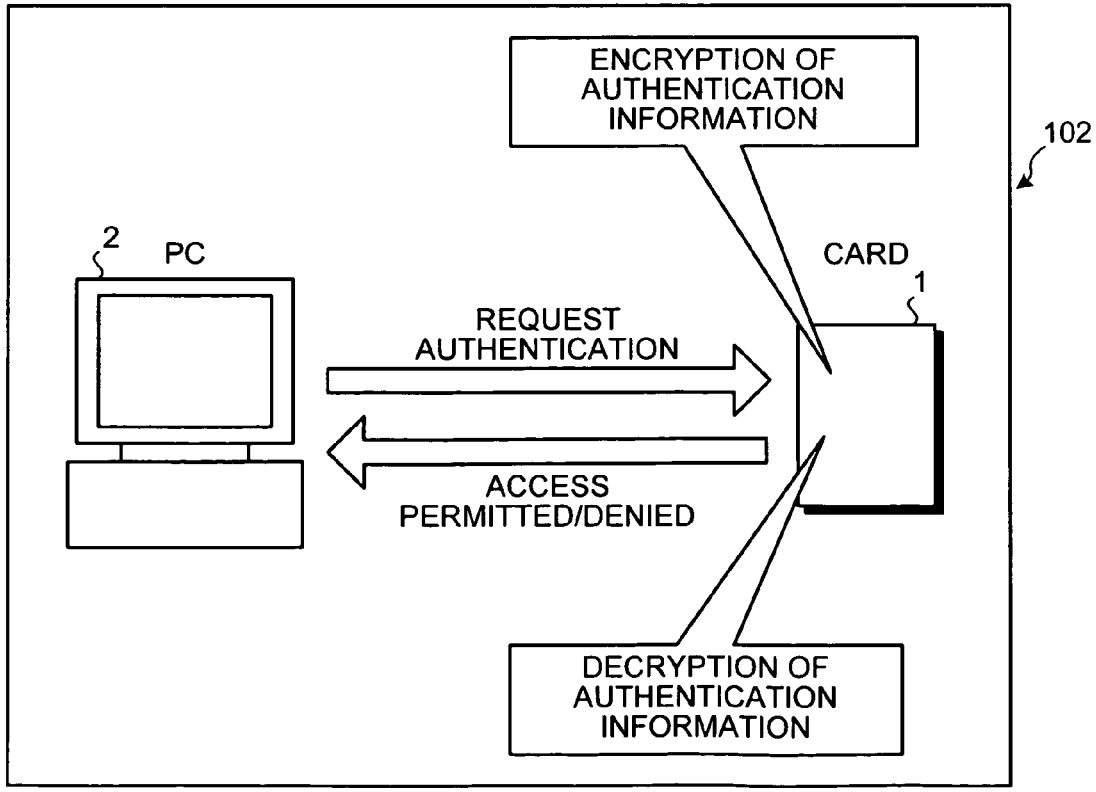

FIG.13

| SCREEN NAME | LOGIN ID | PASSWORD |
|---|---|---|
| APPLI 1 | AAAA | ***** |
| APPLI 2 | BBBB | ***** |
| APPLI 3 | CCCC | ***** |
| ⋮ | ⋮ | ⋮ |

FIG.14

| PC−ID | ENCRYPTED AUTHENTICATION INFORMATION |
|---|---|
| XXXXXXX | A (ENCRYPTION TIME 12:00, VALIDITY PERIOD 10 MINUTES) |
| YYYYYYY | B (ENCRYPTION TIME 13:00, VALIDITY PERIOD 24 HOURS) |
| ZZZZZZZ | C (ENCRYPTION TIME 18:00, VALIDITY PERIOD 5 DAYS) |
| ⋮ | ⋮ |

FIG.15

| CARD ID | AUTHENTICATION TIME | VALIDITY PERIOD |
|---|---|---|
| 00000001 | 12:00 | 10 MINUTES |
| 00000200 | 13:00 | 24 HOURS |
| 00001000 | 18:00 | 5 DAYS |
| ⋮ | ⋮ | ⋮ |

FIG.21
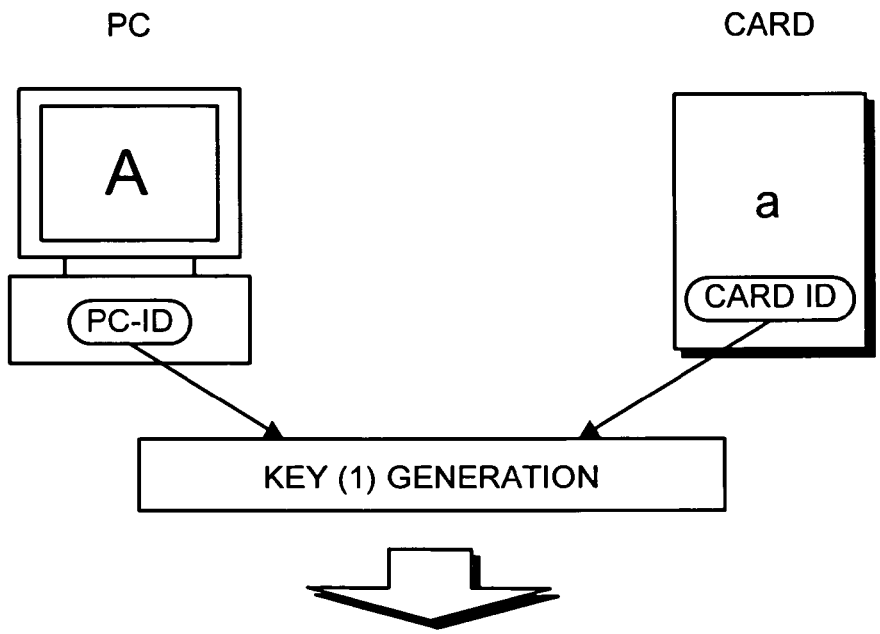
STORE ENCRYPTED AUTHENTICATION INFORMATION (1) IN CARD a
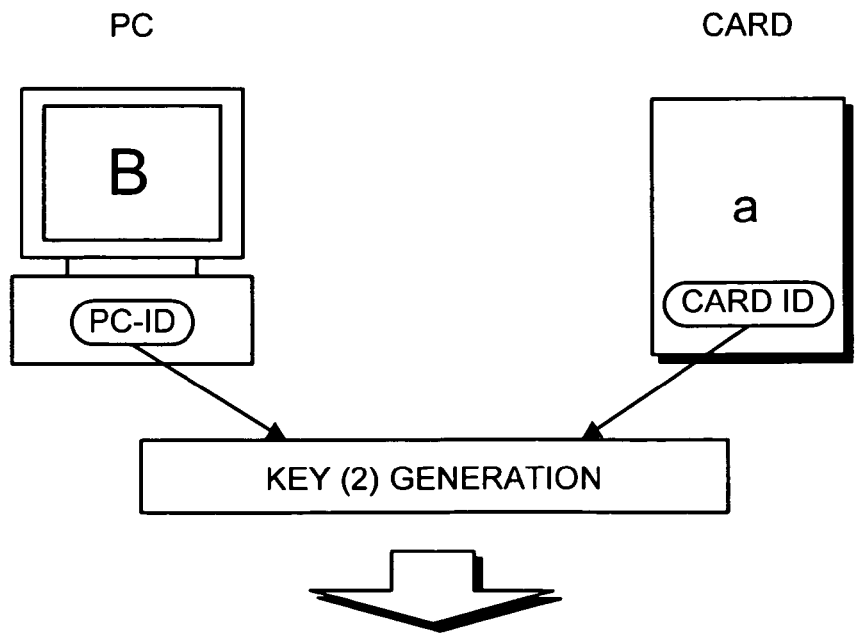
STORE ENCRYPTED AUTHENTICATION INFORMATION (2) IN CARD a

ACCESS AUTHENTICATION METHOD, INFORMATION PROCESSING UNIT, AND COMPUTER PRODUCT

This application is a continuing application, filed under 35 U.S.C. §111(a), of International Application PCT/JP2005/006514, filed Apr. 1, 2005, it being further noted that priority is based upon Japanese Patent Application 2004-108938, filed Apr. 1, 2004.

BACKGROUND OF THE INVENTION

1. Field of the Invention

The present invention relates to a technology for accessing personal information and the like in a recording medium on a personal computer or the like.

2. Description of the Related Art

Conventionally, when accessing personal information, etc. in a recording medium on a personal computer or the like, a user has to enter a personal identification number code (hereinafter, "PIN") for the recording medium each time he/she accesses the information. Such PIN input enhances security and prevents leaks of data including personal information from a recording medium, but impairs usability by forcing a user to enter a PIN each time he/she accesses data in the recording medium.

To solve the problem, a method of accessing a recording medium has been proposed. In the following, the method is explained taking a smart card as an example of a recording medium. The smart card is a plastic card, a little larger than a credit card, embedded with an integrated circuit (IC) chip such as the central processing unit (CPU).

First, a user enters a smart card PIN to access data such as personal information in a smart card on a personal computer. The entered smart card PIN is stored in a memory installed in the personal computer.

The next time the user accesses the data, the smart card PIN stored in the memory is compared to that stored in the smart card. If the two PINs match, the user can access the data. By this means, the user is spared from having to enter the PIN each time he/she accesses the data in the smart card, which facilitates the use of the smart card. Thus, the usability of the smart card can be improved.

Japanese Patent Laid-Open No. HEI6-115287 discloses another method that improves the usability of the smart card. According to the method, first, a user enters a smart card PIN to access data in a smart card on a personal computer. If the smart card PIN is verified, information indicating "PIN verified" is stored in a nonvolatile memory of the smart card. The next time the user accesses the smart card, if the information stored in the nonvolatile memory of the smart card indicates "PIN verified", the user can access the smart card without PIN verification. By this means, the user is spared from having to enter the PIN each time he/she accesses the data in the smart card, which facilitates the use of the smart card. Thus, the usability of the smart card can be improved.

However, the above conventional methods of accessing a smart card have the following disadvantages. That is, when a smart card PIN is stored in a memory of a personal computer, the PIN stored in the memory of the personal computer may leak via a network. As a result, even if the usability of the smart card is improved, the security is considerably reduced.

Besides, consider the case where, after a smart card PIN is verified, information indicating "PIN verified" is stored in a nonvolatile memory of a smart card. If the user loses the smart card while the PIN is valid, a third party may access data in the smart card.

For example, if the user loses the smart card after the smart card PIN is verified in the office, a third party can freely access data such as personal information in the smart card outside the office. Consequently, the security of data is endangered, and it is highly possible that personal information leaks from the smart card.

SUMMARY OF THE INVENTION

It is an object of the present invention to at least partially solve the problems in the conventional technology.

According to an aspect of the present invention, an access authentication method for performing access authentication using a recording medium that is detachably connected to an information processing unit and authentication information provided by a user includes encrypting the authentication information from the user with a predetermined key to generate encrypted authentication information when access authentication based on the authentication information is successful, and storing the encrypted authentication information in the recording medium; and authenticating the encrypted authentication information stored in the recording medium using the predetermined key, and, when the encrypted authentication information is authenticated, determining that access authentication is successful without receiving authentication information from the user.

According to another aspect of the present invention, an information processing unit for performing access authentication using a recording medium that is detachably connected thereto and authentication information provided by a user includes an encrypting unit that encrypts the authentication information from the user with a predetermined key to generate encrypted authentication information when access authentication based on the authentication information is successful, and stores the encrypted authentication information in the recording medium; and an authenticating unit that authenticates the encrypted authentication information stored in the recording medium using the predetermined key, and, when the encrypted authentication information is authenticated, determining that access authentication is successful without receiving authentication information from the user.

According to still another aspect of the present invention, a recording medium that is detachably connected to an information processing unit for performing access authentication using authentication information provided by a user includes an encrypting unit that encrypts the authentication information from the user with a predetermined key to generate encrypted authentication information when access authentication based on the authentication information is successful, and stores the encrypted authentication information in the recording medium; and an authenticating unit that authenticates the encrypted authentication information stored in the recording medium using the predetermined key, and, when the encrypted authentication information is authenticated, determining that access authentication is successful without receiving authentication information from the user.

According to still another aspect of the present invention, a computer-readable recording medium stores therein an access authentication program for implementing the access authentication method on a computer.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 10 is an example of information stored in a free memory area;

FIG. 11 is a schematic illustrating first and second embodiments;

FIG. 13 is an example of protected information;

FIG. 14 is an example of encrypted authentication information;

FIG. 15 is an example of information stored with a card ID in a PC;

FIG. 21 is a schematic illustrating an example of a key generation method; and

DETAILED DESCRIPTION OF THE PREFERRED EMBODIMENTS

Exemplary embodiments of the present invention are explained in detail below while referring to the accompanying drawings.

Figure 1:
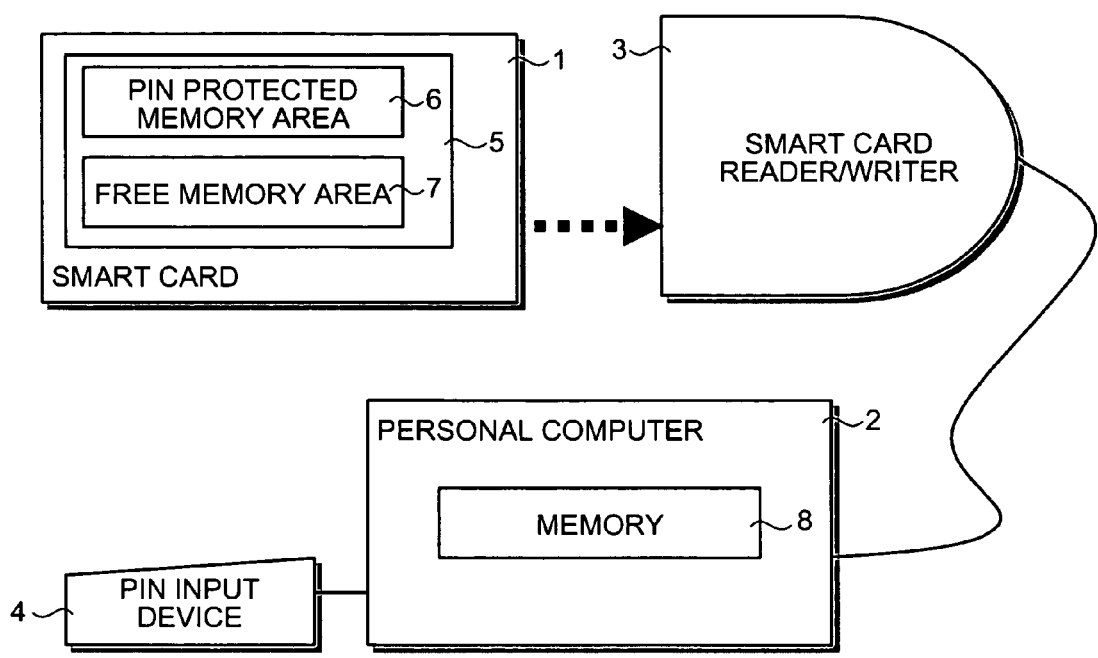
FIG. 1 is a schematic for explaining how a smart card is used.

FIG. 1 is a schematic for explaining how a smart card is used. A smart card includes a storage unit 5 having a PIN protected memory area 6 and a free memory area 7 that can be read without authentication. A personal computer 2 is installed with a memory 8. The memory 8 can be a nonvolatile memory such as a random access memory (RAM). A smart card reader/writer 3 is connected to the personal computer 2, into which a user inserts the smart card 1. A PIN input device 4 is used by the user to enter a PIN when he/she accesses the PIN protected memory area 6 in an attempt to cancel data access protection for the PIN protected memory area 6. Examples of the PIN input device 4 include a keyboard. When the smart card 1 verifies the PIN, the personal computer 2 issues a new certificate 9, and stores the certificate 9 in the memory 8.

The certificate 9 issued by the personal computer 2 includes a public key. With the public key, the personal computer 2 encrypts the input PIN, and stores the encrypted PIN in the free memory area 7 of the smart card 1. Thereafter, when the user accesses the PIN protected memory area 6, the personal computer 2 reads the encrypted PIN from the free memory area 7, and decrypts the PIN using a secret or private key attached to the certificate 9 stored in the memory 8. The personal computer 2 uses the decrypted PIN to cancel data access protection on the smart card 1.

A validity period can be set for the certificate 9 stored in the memory 8. Such a validity period makes it possible to specify a period for which the encrypted PIN stored in the free memory area 7 is valid. Besides, the encrypted PIN stored in the free memory area 7 can be decrypted with only the private key attached to the certificate 9. Therefore, even if, for example, the user loses the smart card 1, the PIN protected memory area 6 is not accessible on another computer.

By storing a plurality of encrypted PINs in the free memory area 7, one user can use a plurality of personal computers with a single smart card. In this case, each encrypted PIN is associated with, for example, the CPU of a personal computer when stored in the free memory area 7 so that the encrypted PIN can be recognized as the one that was encrypted with a public key in a certificate issued by the personal computer.

Figure 2:
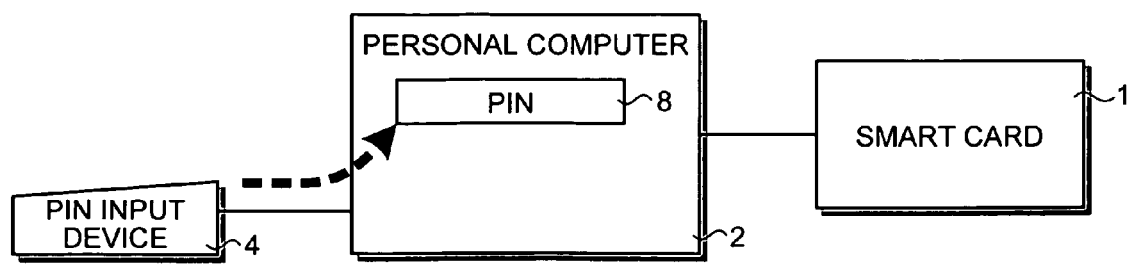
FIG. 2 is a schematic for explaining steps to store a PIN in a personal computer.
Figure 3:
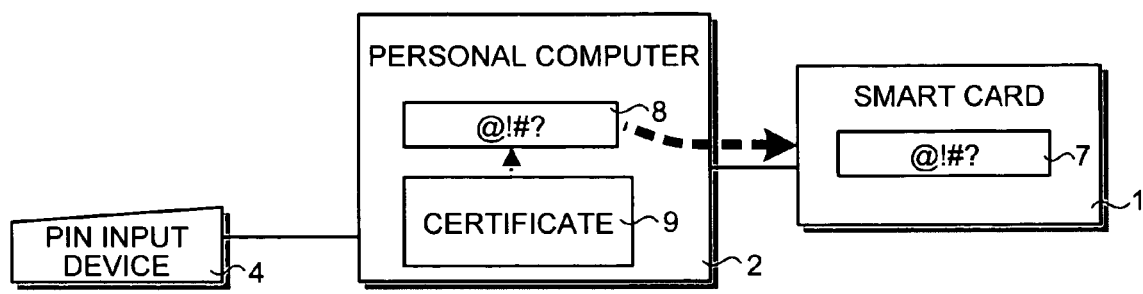
FIG. 3 is a schematic for explaining steps to encrypt and store the PIN in a smart card.
Figure 4:
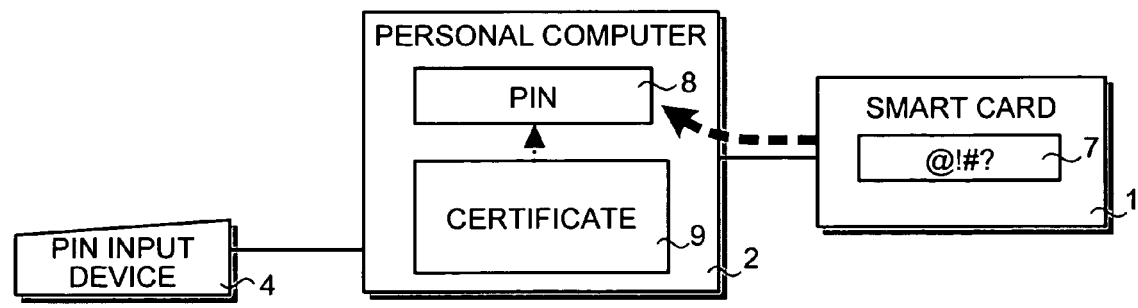
FIG. 4 is a schematic for explaining steps to read and decrypt an encrypted PIN.

Referring to FIGS. 2 to 4, steps from PIN input to PIN authentication are explained. Incidentally, the smart card reader/writer 3 is not shown in FIGS. 2 to 4.

FIG. 2 is a schematic for explaining steps to store a PIN in the personal computer 2. The smart card 1 is connected to the personal computer 2 so that the personal computer 2 reads data from the smart card 1. To access data stored in the PIN protected memory area 6, a PIN is input through the PIN input device 4. The input PIN is stored in the memory 8 of the personal computer 2. When the input PIN is verified, the data stored in the PIN protected memory area 6 becomes accessible.

FIG. 3 is a schematic for explaining steps to encrypt the PIN and store the encrypted PIN in the smart card 1. The personal computer 2 encrypts the PIN stored in the memory 8 with a public key cryptosystem. In the drawings, the encrypted PIN is conceptually expressed as "@!#?". The PIN is not necessarily encrypted into such a string of characters. At this time, the personal computer 2 issues the certificate 9, and the user specifies a period for which the PIN is valid. The personal computer 2 stores the encrypted PIN "@!#?" in the free memory area 7 of the smart card 1.

FIG. 4 is a schematic for explaining steps to read and decrypt the encrypted PIN "@!#?". The smart card 1 is re-connected to the personal computer 2 so that the personal computer 2 reads data from the smart card 1. The personal computer 2 reads the encrypted PIN "@!#?" stored in the free memory area 7, and decrypts the PIN with a private key that corresponds to a public key used to encrypt the PIN. If the decrypted PIN is authenticated, the user is allowed to access the data stored in the PIN protected memory area 6 of the smart card 1.

By this means, the card's PIN is not cached in the memory of the personal computer, and is not to be leaked by analyzing the memory.

Figure 5:
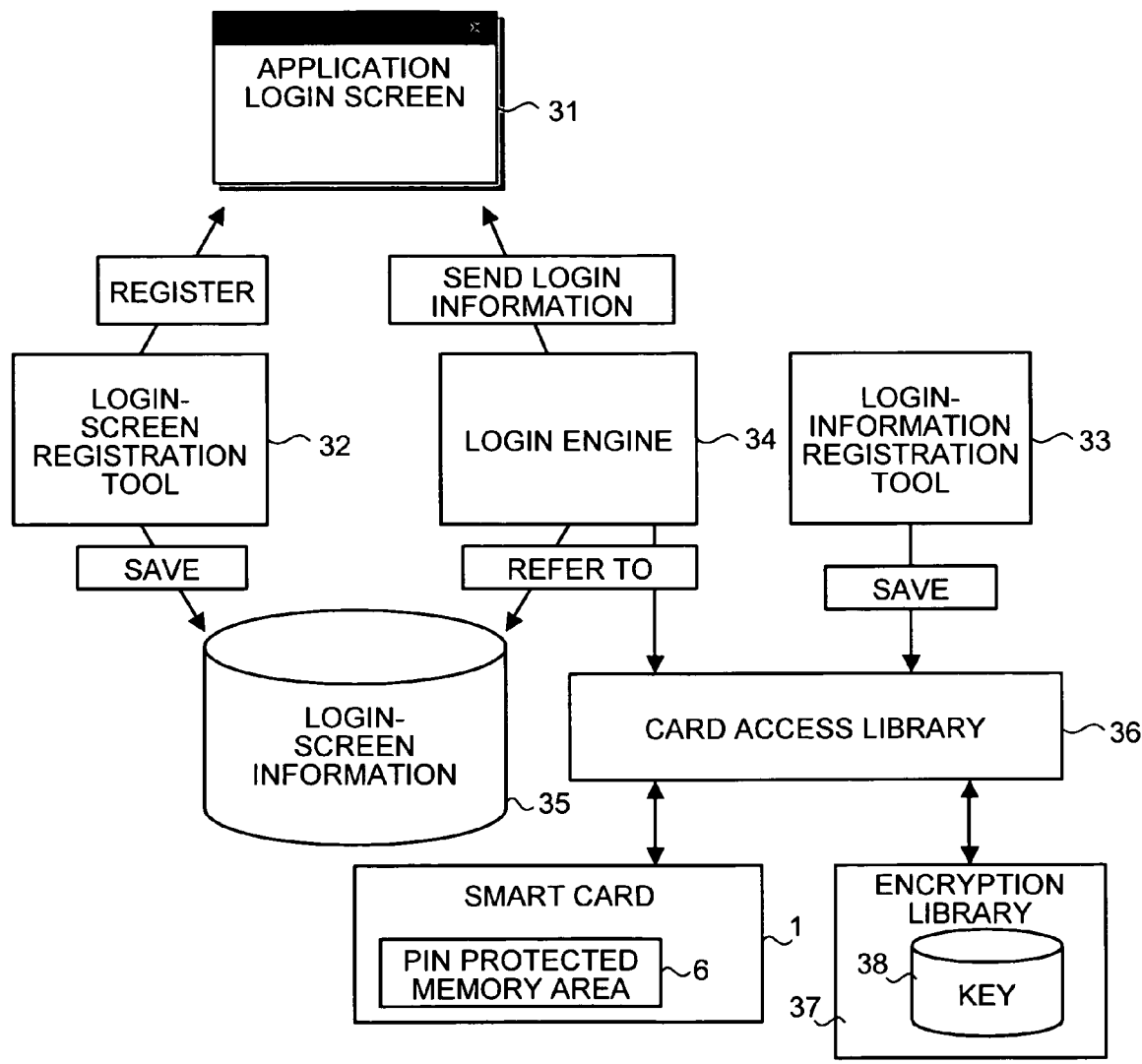
FIG. 5 is a block diagram of a first embodiment.

The construction of the first embodiment is explained by taking as an example a function of the smart card to login to an application with reference to FIG. 5. The construction of FIG. 5 includes a login screen 31, a login-screen registration tool 32, a login-information registration tool 33, a login engine 34, a login-screen information file 35, a card access library 36, an encryption library 37, and a key 38.

With the login-screen registration tool 32, a user stores in the login-screen information file 35 login-screen information to identify a screen to login to an application. Using the login-information registration tool 33, the user registers login information on the smart card 1 via the card access library 36. The login information includes an ID and a password to be entered on the registered application login screen 31. On this occasion, the login information is stored in the PIN protected memory area 6 protected by a PIN.

The login engine 34 is a resident program that requests the login information from the smart card 1 when a screen is displayed that matches the login-screen information stored in the login-screen information file 35. After PIN protection is canceled, the login engine 34 reads the login information, and sends the login information to the application login screen 31. Thereby, the user logs in to the application using the smart card 1.

Conventionally, login information is stored in an area protected by a PIN. Therefore, a PIN for the smart card 1 has to be authenticated each time a user wishes to access the smart card 1 to obtain the application login information stored therein. The present invention, however, requires PIN authentication only once at the first time.

Figure 6:
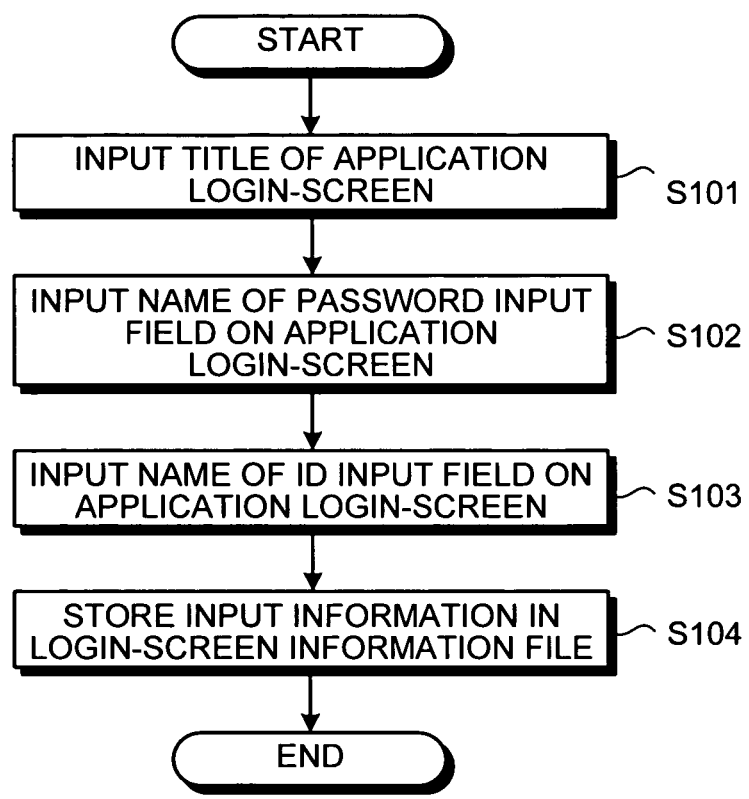
FIG. 6 is a flowchart of operation using a login-screen registration tool.

FIG. 6 is a flowchart of operation using the login-screen registration tool. A user enters the title of an application login-screen (step S101). The user enters the name of a field to enter a password on the application login-screen (step S102). The user enters the name of a field to enter an ID on the application login-screen (step S103). The application login-screen title, the password input field name, and the ID input field name input by the user are stored in the login-screen information file (step S104).

Figure 7:
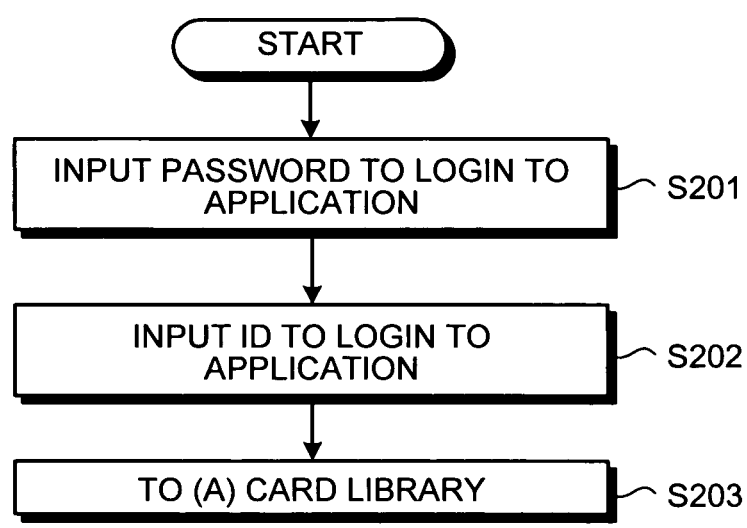
FIG. 7 is a flowchart of operation using a login-information registration tool.

FIG. 7 is a flowchart of operation using the login-information registration tool. The user enters the password to login to an application (step S201). The user enters the ID to login to an application (step S202). The user accesses the card access library to store the input password and the ID in the smart card (step S203).

Figure 8:
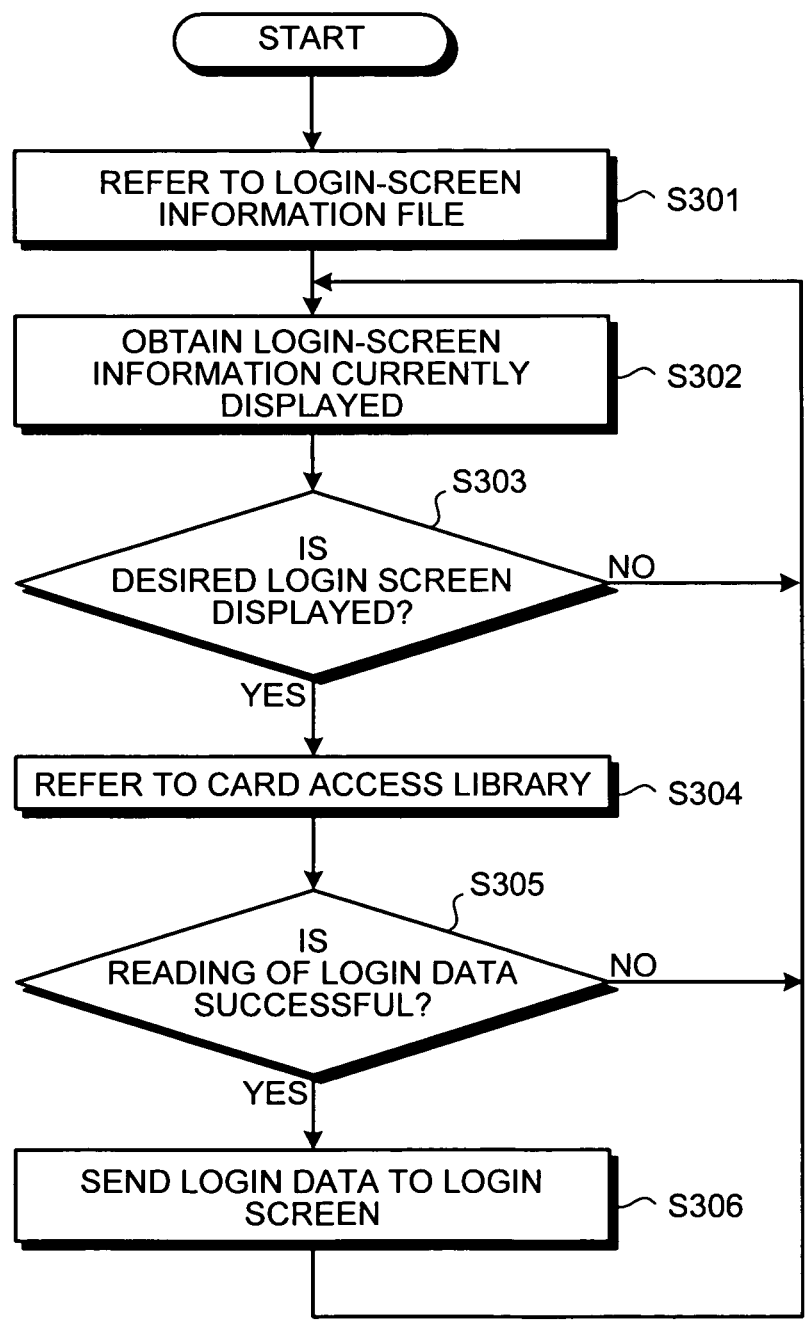
FIG. 8 is a flowchart of the operation of a login engine.

FIG. 8 is a flowchart of the operation of the login engine. The login engine refers to login-screen information stored in the login-screen information file (step S301). The login engine reads information currently displayed on the screen (step S302). The login engine determines whether a login screen is displayed which contains the login-screen information that the login engine referred to at step S301 (step S303). If the information displayed on the screen does not match the login-screen information, the login engine again reads information currently displayed on the screen.

If the information displayed on the screen matches the login-screen information, the login engine refers to the card access library (step S304). Based on the card access library, the login engine determines whether the reading of login information is successful (step S305). When login information for a displayed login screen is read, the login engine sends the login information to the login screen (step S306).

Figure 9:
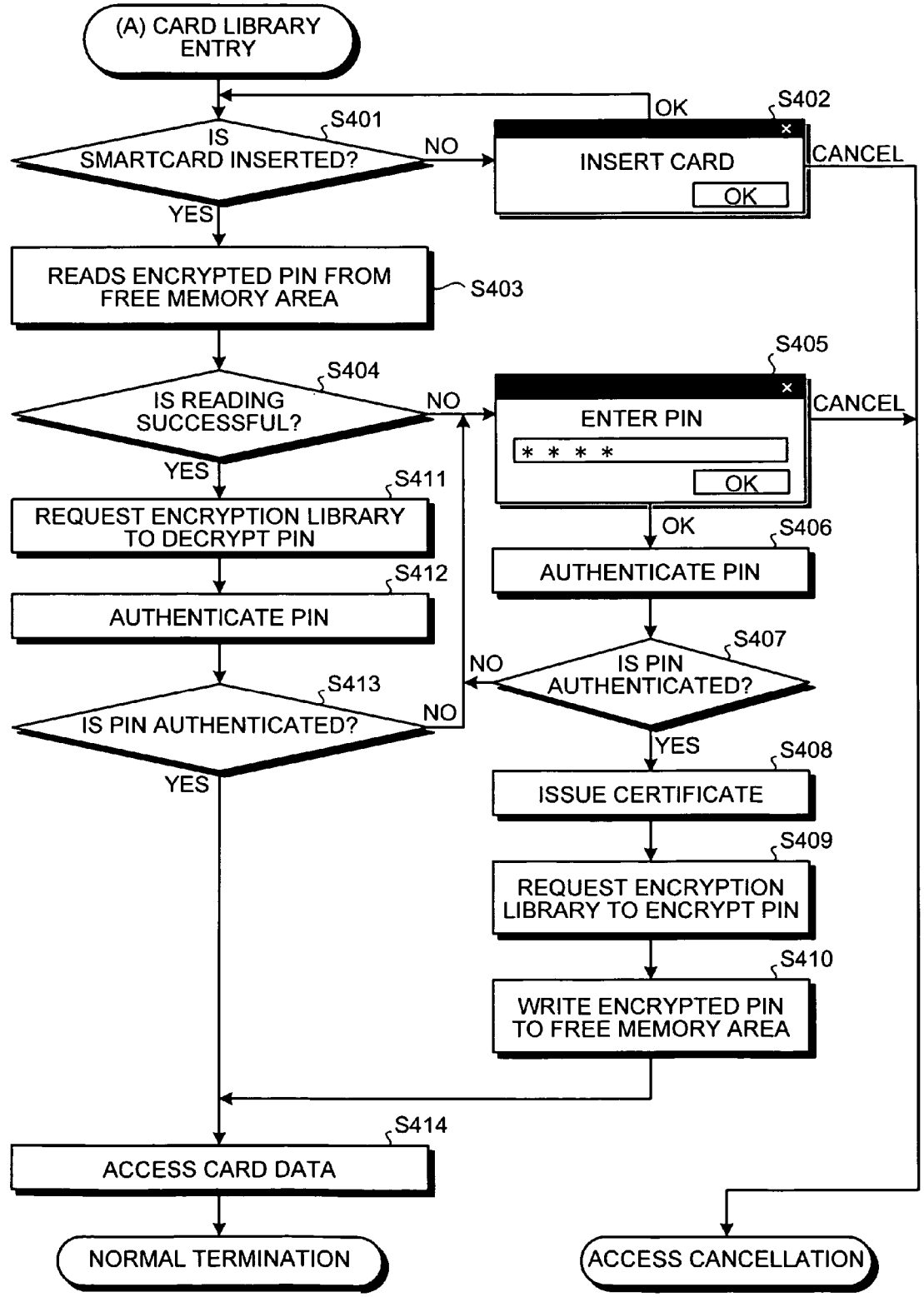
FIG. 9 is a flowchart of the operation of a card access library.

FIG. 9 is a flowchart of the operation of the card access library. The card access library determines whether the smartcard is inserted in the smart card reader/writer (step S401). If not, the card access library displays "Insert Card" on the login screen. If "OK" is selected, the card access library again determines whether the smartcard is inserted in the smart card reader/writer.

If "Cancel" is selected, the card access library terminates the operation to access the smart card (step S402). When determining that the smartcard is inserted in the smart card reader/writer, the card access library reads an encrypted PIN from the free memory area (step S403).

The card access library determines whether the reading of the encrypted PIN is successful (step S404). When the reading of the encrypted PIN fails, the card access library displays "Enter Pin" on the login screen (step S405). If "Cancel" is selected, the card access library terminates the operation to access the smart card. When a PIN is entered and "OK" is selected, the card access library authenticates the PIN (step S406).

If the PIN is not authenticated successfully, the card access library again displays "Enter Pin" on the login screen. When the PIN is authenticated successfully, the card access library issues a certificate (steps S407, S408). The card access library requests the encryption library to encrypt the authenticated PIN (step S409).

The PIN encrypted by the encryption library is stored in the free memory area, and the user is allowed to access the password and the ID in the smart card (steps S410, 414). When the reading of the encrypted PIN succeeds at step S404, the card access library requests the encryption library to decrypt the encrypted PIN (step S411).

The card access library authenticates the decrypted PIN (step S412). If the PIN is not authenticated successfully, the operation flow moves to step S405. When the PIN is authenticated successfully, the user is allowed to access the password and the ID in the smart card (step S414).

FIG. 10 is an example of information stored in the free memory area 7 of a smart card. To use a plurality of personal computers with a single smart card, the free memory area 7 stores therein a PIN encrypted by each personal computer with a data size of 32 bytes, ID information of the CPU of the corresponding personal computer with a data size of 16 bytes, and the number of encrypted PINs with a data size of 1 byte.

When a user uses a smart card on a particular personal computer, a corresponding encrypted PIN and ID information of the CPU is read from the free memory area if present. Thereby, the user tries to access personal information stored in the PIN protected memory area.

The following describes modifications of the smart card according to the first embodiment of the present invention, and other technical availabilities.

According to the first embodiment, a pin code is not limited to a string of characters, and also not necessarily a combination of an ID and a password. Personal information of a user can be secured with fingerprint recognition or the like. Besides, the smart card is not necessarily used on a personal computer, but can be used on other information equipment.

In the above description, although a PIN is encrypted with a public key cryptosystem, the encryption method is not limited particularly. For example, secret-key cryptography can be used to encrypt a PIN. Each encrypted PIN is associated with the CPU of a personal computer so as to be recognized as the one that was encrypted with a certificate on the personal computer. However, a PIN is not necessarily associated with CPU as long as it is possible to identify a personal computer that encrypted the PIN. Further, a validity period is set for a certificate on the personal computer, but is not so limited.

According to the first embodiment, the personal computer is not necessarily separate from the smart card reader/writer, and can include a smart card reader/writer unit as a part thereof.

In the above description, although the personal computer issues a new certificate when the smart card verifies a PIN, such a certificate can be registered in advance. Additionally, personal information, etc. are stored in the smart card. However, the use of the smart card is not essential, and any storage medium can be employed that is capable of storing such personal information.

In the following, a second embodiment of the present invention is explained. First, an overview of the second embodiment is presented with reference to FIG. 11. FIG. 11 is a schematic illustrating the first and second embodiments. In the first embodiment described above (see 101 in FIG. 11), encryption and decryption of authentication information are performed on the personal computer (hereinafter, "PC") 2 side.

More specifically, in the first embodiment, the first time a user enters a PIN, the PC 2 encrypts the PIN. The encrypted PIN is registered in the smart card (hereinafter, "card", or "card-type recording device") 1. Once the PIN is authenticated successfully, i.e., from the second occasion that requires PIN input, the PC 2 reads the encrypted PIN registered in the card 1, and decrypts the read encrypted PIN into the original state for use.

Therefore, according to the first embodiment, access authentication can be performed effectively without an obligation imposed on the user to input a PIN a plurality of times. Besides, the encryption of a PIN to be stored in the card 1 prevents the PIN from leaking even if the user loses the card 1.

As described above, according to the first embodiment, although encryption/decryption of authentication information is performed on the PC 2 side, it is not so limited, and can be performed on the card 1 side (see 102 in FIG. 11). By this means, the processing load caused by access authentication can be reduced on the PC 2 side. In addition, authentication equivalent to that of the first embodiment can be performed regardless of the type of the PC 2. For this reason, the second embodiment describes the access authentication process in the case where encryption/decryption of authentication information is performed on the card 1 side.

Incidentally, according to the second embodiment, on the occasion that requires PIN input, the PC 2 requests the card 1 to perform authentication, and the card 1 returns the result of the authentication (access permitted or denied) in response to the request.

Figure 12:
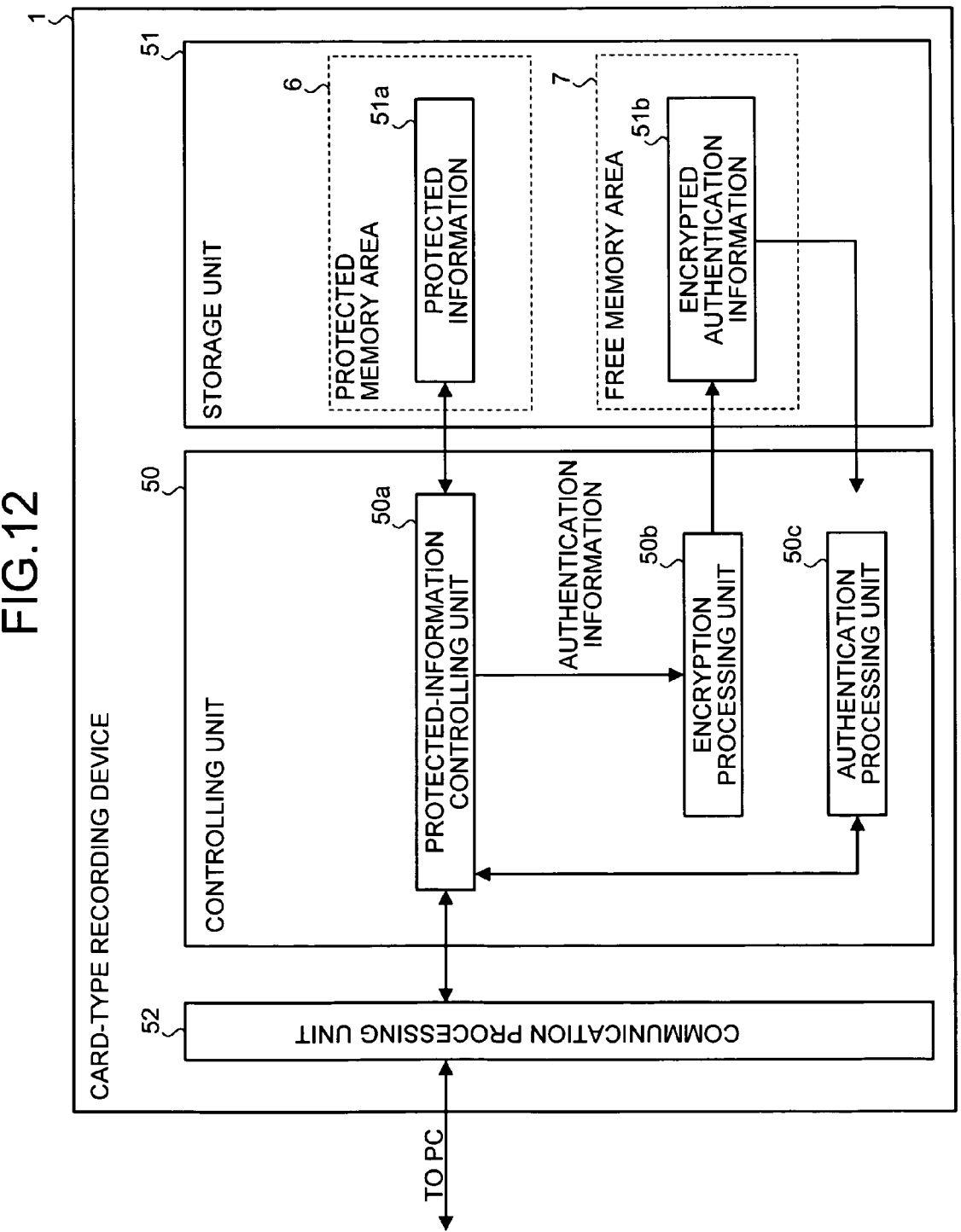
FIG. 12 is a functional block diagram of the construction of a card-type recording device according to the second embodiment.

FIG. 12 is a functional block diagram of the construction of the card-type recording device 1 according to the second embodiment. The card-type recording device 1 includes a controlling unit 50, a storage unit 51, and a communication processing unit 52. Through the communication processing unit 52, the card-type recording device 1 communicates with the PC 2. The communication processing unit 52 has a connector to connect to the smart card reader/writer 3. The communication processing unit 52 supports data transmission/reception between the PC 2 and the controlling unit 50.

The controlling unit 50 includes a protected-information controlling unit 50a, an encryption processing unit 50b, and an authentication processing unit 50c. The storage unit 51 stores therein protected information 51a and encrypted authentication information 51b. The protected information 51a is stored in the PIN protected memory area (hereinafter, "protected memory area") 6, while the encrypted authentication information 51b is stored in the free memory area 7.

The card-type recording device 1 communicates with the PC 2 via the smart card reader/writer 3. The following description, however, does not mention the smart card reader/writer 3.

The controlling unit 50 receives an authentication request from the PC 2. The controlling unit 50 controls access to the protected information 51a using authentication information (e.g., PIN) as well as creating and decrypting the encrypted authentication information 51b used for the access control.

The protected-information controlling unit 50a accepts an authentication request from the PC 2, and authenticates a user-input PIN contained in the authentication request. When the PIN is authenticated successfully, the protected-information controlling unit 50a allows access to the protected information 51a. Once the authentication process is successful, the protected-information controlling unit 50a performs PIN authentication using a PIN received from the authentication processing unit 50c.

More specifically, on the first occasion that requires PIN input after the card-type recording device 1 is connected to the PC 2, the protected-information controlling unit 50a receives an authentication request from the PC 2. Having received the authentication request, the protected-information controlling unit 50a tries to access the protected information 51a using a PIN contained in the authentication request (authenticates the PIN). When the PIN is authenticated successfully, the protected-information controlling unit 50a sends the encryption processing unit 50b the PIN contained in the authentication request. The encryption processing unit 50b encrypts the PIN, and stores the encrypted PIN in the free memory area 7 as the encrypted authentication information 51b.

From the second occasion that requires PIN input on the PC 2, the protected-information controlling unit 50a performs PIN authentication using a PIN received from the authentication processing unit 50c. The authentication processing unit 50c obtains the PIN by decrypting the encrypted authentication information 51b stored in the free memory area 7.

The encryption processing unit 50b receives authentication information (e.g., a PIN and a key) from the protected-information controlling unit 50a, and encrypts the received PIN with the key. Then, the encryption processing unit 50b stores the encrypted PIN in the free memory area 7 as the encrypted authentication information 51b. For example, the encryption processing unit 50b receives an encryption key from the PC 2 via the protected-information controlling unit 50a, and encrypts a PIN sent from the PC 2 with the encryption key.

As previously described in the first embodiment, the encryption key can be the public key of a pair of keys (public and private keys) used in a public key cryptosystem, or a secret or private key used in a secret key cryptosystem. Incidentally, when encryption is performed with a public key in a public key cryptosystem, decryption is performed with a private key paired with the public key.

The authentication processing unit 50c receives a decryption key from the protected-information controlling unit 50a. With the decryption key, the authentication processing unit 50c decrypts the encrypted authentication information 51b stored in the free memory area 7, and sends the decrypted information to the protected-information controlling unit 50a. For example, the authentication processing unit 50c receives the decryption key from the PC 2 via the protected-information controlling unit 50a. As the decryption key, a private key paired with a public key is used when the encryption processing unit 50b performs encryption using the public key in a public key cryptosystem. On the other hand, when encryption is performed using a secret or private key in a secret key cryptosystem, the same secret key is used for both encryption and decryption.

The storage unit 51 is configured with a flash memory such as a nonvolatile RAM. The storage unit 51 corresponds to the storage unit 5 of the first embodiment (see "storage unit 5" in FIG. 1). The storage unit 51 includes the protected memory area 6 (see "PIN protected memory area 6" in FIG. 1) and the free memory area 7 (see "free memory area 7" in FIG. 1). The protected memory area 6 becomes accessible only after successful PIN authentication, while the free memory area 7 allows free access. The protected memory area 6 and the free memory area 7 store the protected information 51a and the encrypted authentication information 51b, respectively.

FIG. 13 is an example of the content of the protected information 51a. The protected information 51a includes such items as screen names, login IDs, and passwords. The term "screen name" as used herein refers to a name that uniquely identifies a login screen for each application. The login ID is entered on the login screen together with the password.

In the example of FIG. 13, a login ID "AAAA" is entered on a login screen with a screen name of "Appli 1", and a login ID "BBBB" is entered on a login screen with a screen name of "Appli 2". In this manner, by storing in the card-type recording device 1 information to be entered on each login screen, authentication can be performed while saving the user from complicated input operation. As the protected information 51a, information can be stored in advance, or stored each time the PC 2 requests to register the information.

The protected information 51a is present in the protected memory area 6 that becomes accessible only after successful PIN authentication. Therefore, even if the protected information 51a includes the aforementioned login information, the login information is not to be leaked.

FIG. 14 is an example of the content of the encrypted authentication information 51b. The encrypted authentication information 51b is information that the encryption processing unit 50b has obtained by encrypting a PIN (user-input PIN) received from a PC. The encrypted authentication information 51b includes encryption time and validity period. Besides, each piece of encrypted authentication information (A, B and C in FIG. 14) is associated with a PC-ID that uniquely identifies a PC connected when the encrypted authentication information is generated. The PC-ID is only required to be capable of uniquely identifying a PC, and such information as a CPU-ID or a MAC address can be used.

In the example of FIG. 14, encrypted authentication information A is generated (encrypted) at 12:00, when a PC with PC-ID "XXXXXXXX" is connected. The encrypted authentication information A is valid for 10 minutes. If it is determined that the encryption time and validity period have to be referred to before decryption and encrypted authentication information is not to be decrypted when expired, users can share the same PC at different times or night work can be prohibited.

In addition, when a plurality of pieces of encrypted authentication information have been associated with PC-IDs, respectively, a user can operate a plurality of PCs by one card-type recording device 1.

Referring next to FIG. 15, modification of the association between a PC-ID and encrypted authentication information shown in FIG. 14 is explained. FIG. 15 is an example of information stored with a card ID in the memory 8 (see FIG. 1) of the PC 2. The PC 2 stores information including a card ID that uniquely identifies a card-type recording device, the authentication time at which the card-type recording device was authenticated, and a validity period for which authentication is valid. The card ID is only required to be capable of uniquely identifying a card-type recording device, and such information as the ID of an IC built in a card-type recording device can be used. For example, a card-type recording device with card ID "00000001" is authenticated at 12:00, and the authentication is valid for 10 minutes. That is, with the card-type recording device, a user is not allowed to operate the PC 2 after 12:10.

Figure 16:
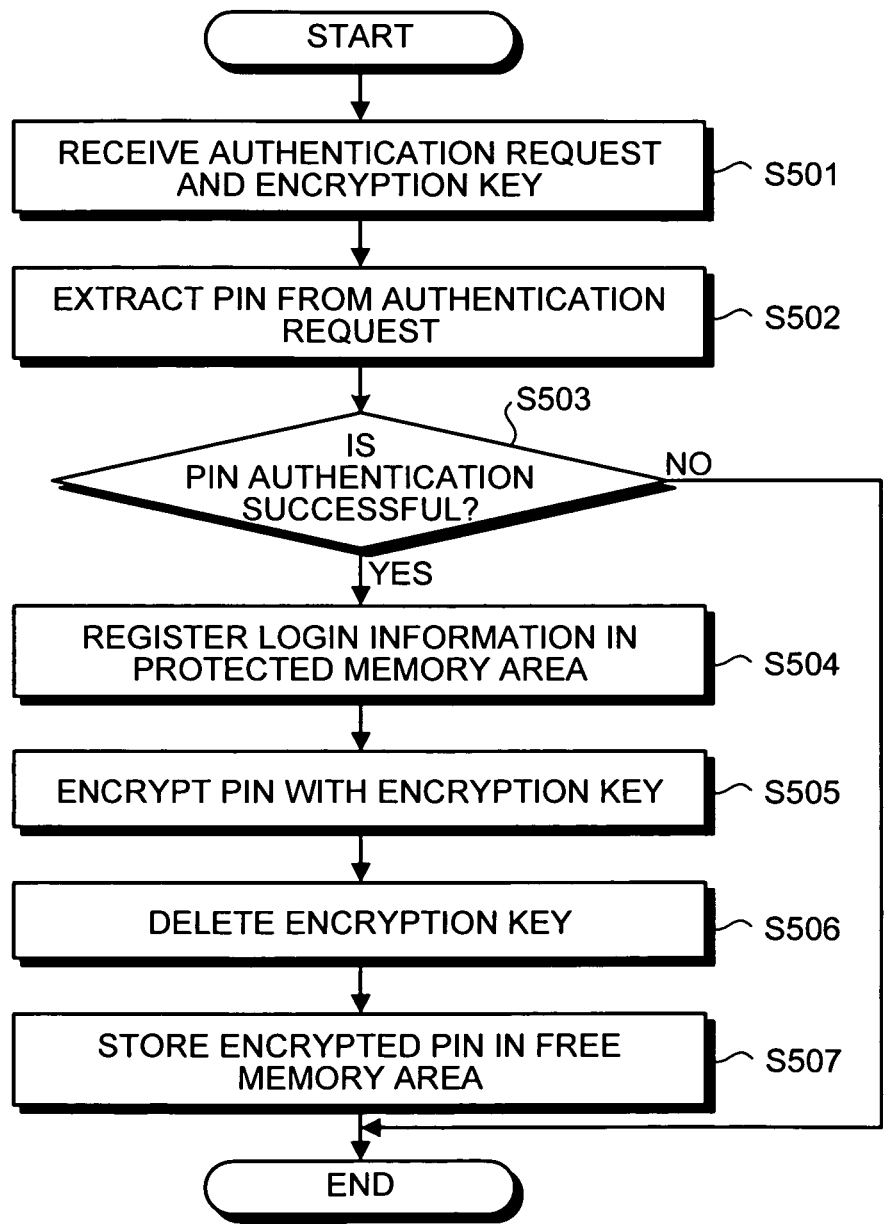
FIG. 16 is a flowchart of the encryption process according to the second embodiment.

FIG. 16 is a flowchart of the encryption process according to the second embodiment. Having received an authentication request and an encryption key via the communication processing unit 52 (step S501), the protected-information controlling unit 50a extracts a PIN (user-input PIN) from the received authentication request (step S502).

The protected-information controlling unit 50a performs PIN authentication using the extracted PIN to grant access to the protected memory area 6. When the PIN is authenticated successfully (YES at step S503), login information contained in the authentication request is registered in the protected memory area 6 as the protected information 51a (step S504). On the other hand, if the PIN authentication fails (NO at step S503), the process terminates without the following steps S504 to S507.

Subsequent to step S504, the encryption processing unit 50b encrypts the PIN extracted from the authentication request at step S502 with an encryption key received from the PC 2 (step S505). The encryption processing unit 50b deletes the encryption key used for the encryption (step S506), and stores the encrypted PIN in the free memory area 7 as the encrypted authentication information 51b (step S507). Thereby, the encryption processing unit 50b terminates the encryption process.

Figure 17:
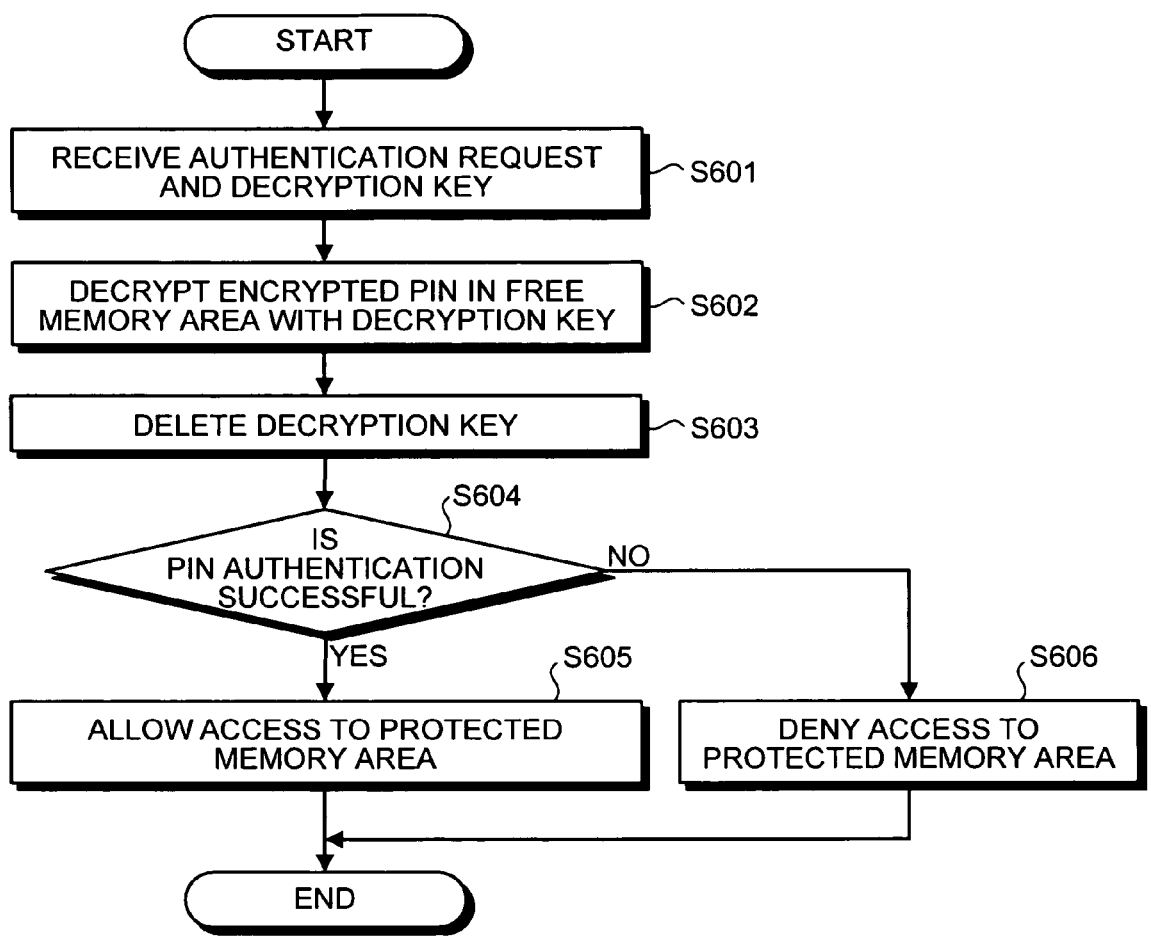
FIG. 17 is a flowchart of the authentication process according to the second embodiment.

FIG. 17 is a flowchart of the authentication process according to the second embodiment. Having received an authentication request and a decryption key via the protected-information controlling unit 50a (step S601), the authentication processing unit 50c decrypts an encrypted PIN contained in the encrypted authentication information 51b stored in the free memory area 7 with the decryption key (step S602).

If, for example, the encrypted authentication information 51b includes such items as shown in FIG. 14, the authentication processing unit 50c refers to the PC-ID, encryption time and validity period. The authentication processing unit 50c checks whether the PC-ID of the currently connected PC 2 matches the PC-ID contained in the encrypted authentication information 51b, and whether the current date and time are within the validity period. Under these conditions, the authentication processing unit 50c performs decryption. Incidentally, it is assumed, in this case, that the current date and time are provided from the PC 2. The PC 2 obtains the current date and time using the internal clock, or through a certificate authority on a network.

After that, the authentication processing unit 50c deletes the decryption key used for the decryption (step S603). On receipt of the decrypted PIN from the authentication processing unit 50c, the protected-information controlling unit 50a performs PIN authentication using the PIN to grant access to the protected memory area 6. When the PIN is authenticated successfully (YES at step S604), the protected-information controlling unit 50a allows the PC 2 to access the protected memory area 6 (step S605). On the other hand, if the PIN authentication fails (NO at step S604), the process terminates while the protected memory area 6 is inaccessible (step S606).

As described above, according to the second embodiment, encryption/decryption of authentication information is performed by the card-type recording device 1. Thereby, the processing load caused by access authentication can be reduced on the PC 2 side. In addition, authentication equivalent to that of the first embodiment can be performed regardless of the type of the PC 2.

According to the second embodiment, a plurality of PCs can be used with a single card-type recording device that performs access authentication for each PC connected thereto. However, when a user lends his/her PC to another person or a plurality of users share the same PC, a malicious third party may misuse information stored in the card-type recording device. For this reason, a third embodiment describes a card-type recording device having a function to prevent misuse of information by unauthorized users.

Figure 18:
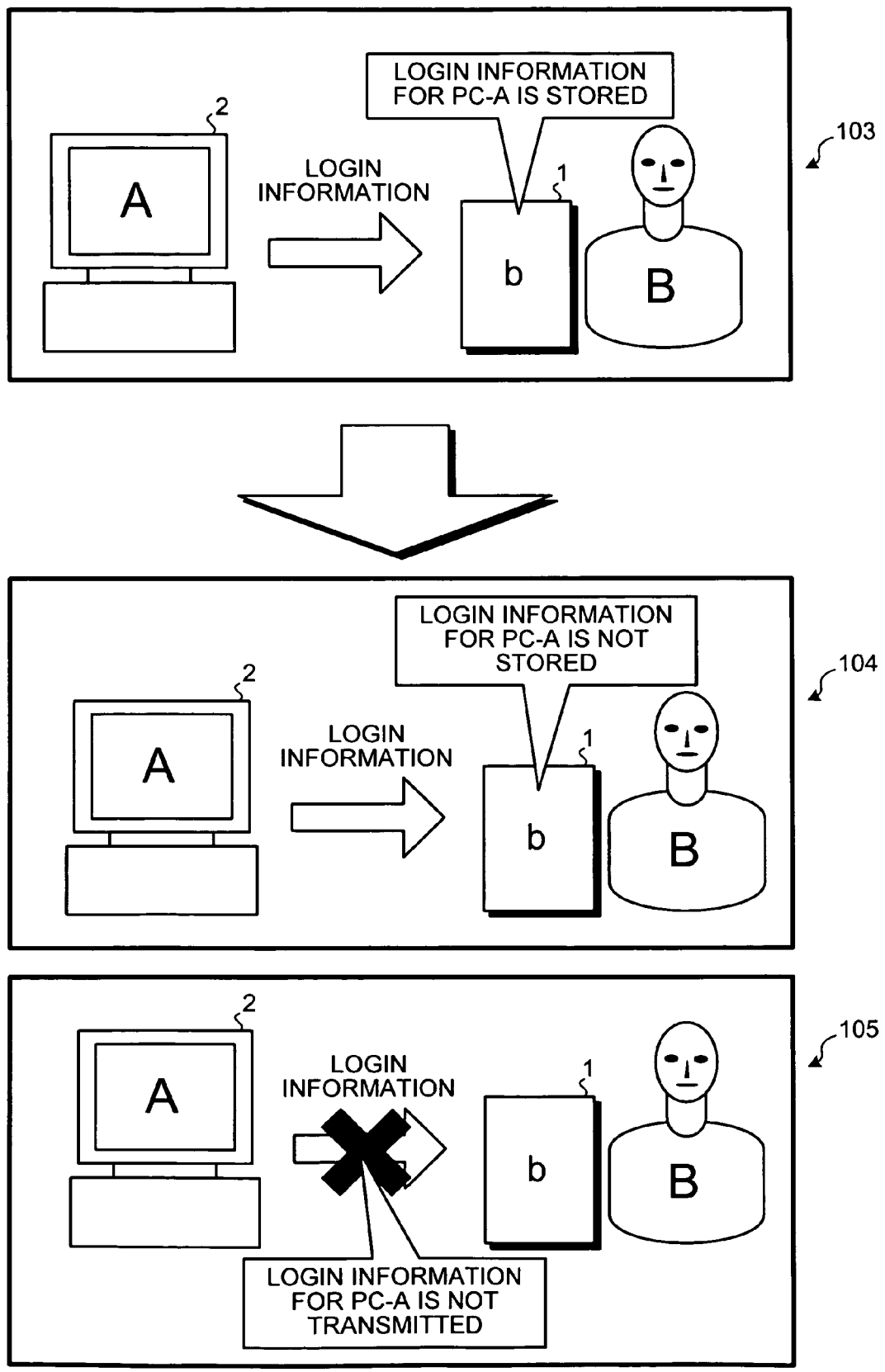
FIG. 18 is a schematic illustrating a third embodiment.

First, a measure to prevent such misuse as outlined above is explained referring to FIG. 18. FIG. 18 illustrates the case where a user A lends his/her PC-A (PC 2) to a user B. In this case, the user B connects his/her card b (card-type recording device 1) to the PC-A, and enters a PIN for the card b to be authenticated. If access authentication (PIN authentication) is successful, the user B is authorized to login to the PC-A. Login information for the PC-A is stored in the protected memory area 6.

Consequently, even after completion of operation on the PC-A, the user B can refer to the login information for the PC-A stored in the card b. As such, once the access authentication (PIN authentication) succeeds, information for the PC 2 may be stored in the card-type recording device 1. If a malicious user comes to possess the card-type recording device 1, there are chances that private or confidential information is leaked.

As indicated by the reference numeral 104 in FIG. 18, according to the third embodiment, even when login information is sent from the PC 2 to the card-type recording device 1, the login information is not stored in the card-type recording device 1. Incidentally, as indicated by the reference numeral 105 in FIG. 18, when the PC-A is prevented from sending login information to the card-type recording device 1, the same effect can be achieved as in the case of 104 in FIG. 18.

Figure 19:
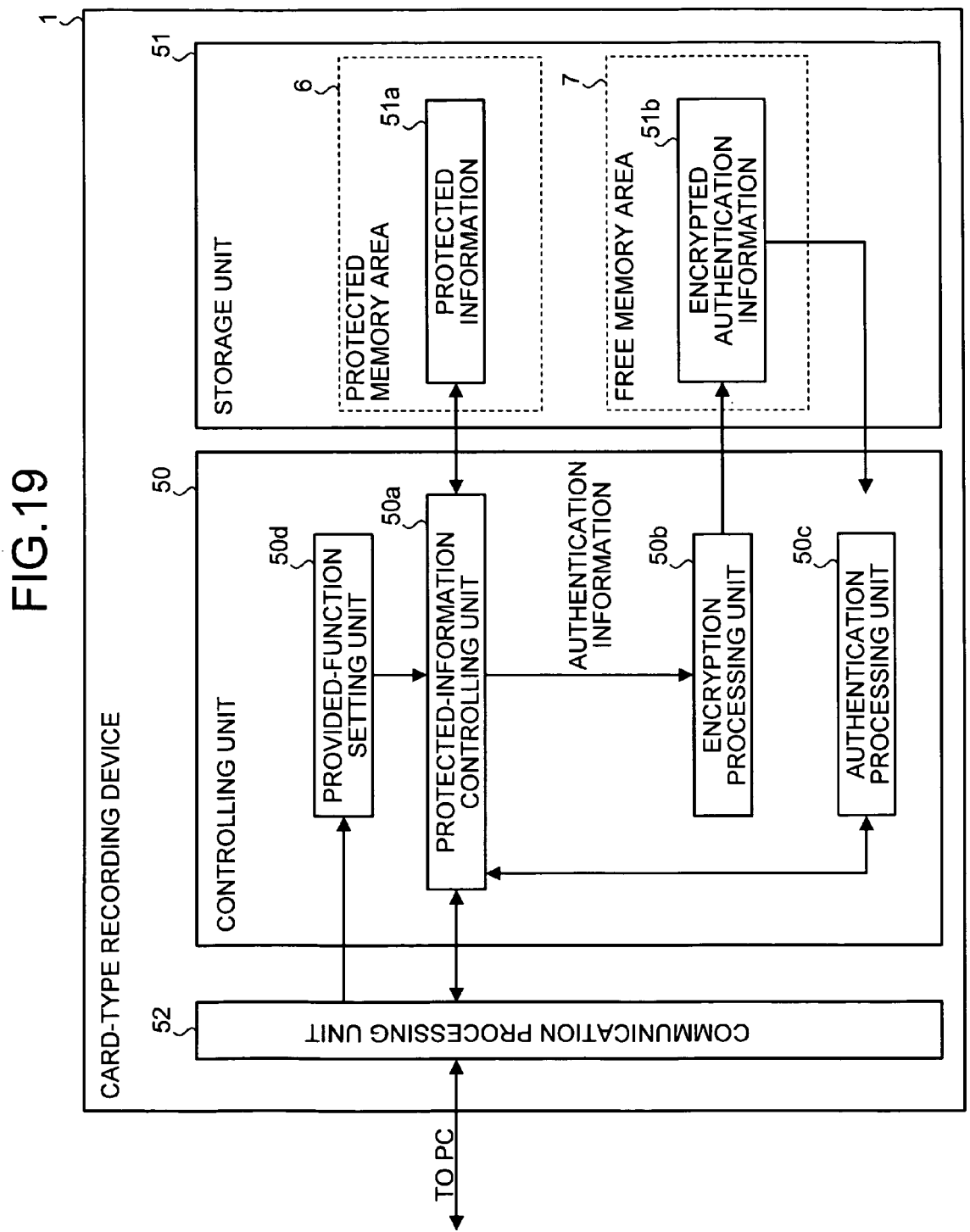
FIG. 19 is a functional block diagram of the construction of a card-type recording device according to the third embodiment.

FIG. 19 is a functional block diagram of the construction of the card-type recording device 1 according to the third embodiment. The only difference from the card-type recording device 1 of the second embodiment (see FIG. 12) is explained hereinafter, and the same description is not repeated.

The card-type recording device 1 of the third embodiment further includes a provided-function setting unit 50d in the controlling unit 50. The provided-function setting unit 50d sends an instruction to the protected-information controlling unit 50a based on setting information provided by a user to limit data writing to the protected memory area 6 and the free memory area 7.

In the example of FIG. 18, if the user A stores in his/her PC-A (PC 2) such setting information to prohibit data writing to the card 1 before lending the PC-A, the card-type recording device 1 reads the setting information. Thus, the provided-function setting unit 50d limits access to the storage unit 51.

Accordingly, when the user B operates the PC-A using the card b (card-type recording device 1), login information for the PC-A is not to be written to the card b. That is, in such cases as where a user lends his/her PC to another person or a plurality of users share the same PC, it is possible to effectively prevent authentication information for the PC from leaking to a malicious user.

Figure 20:
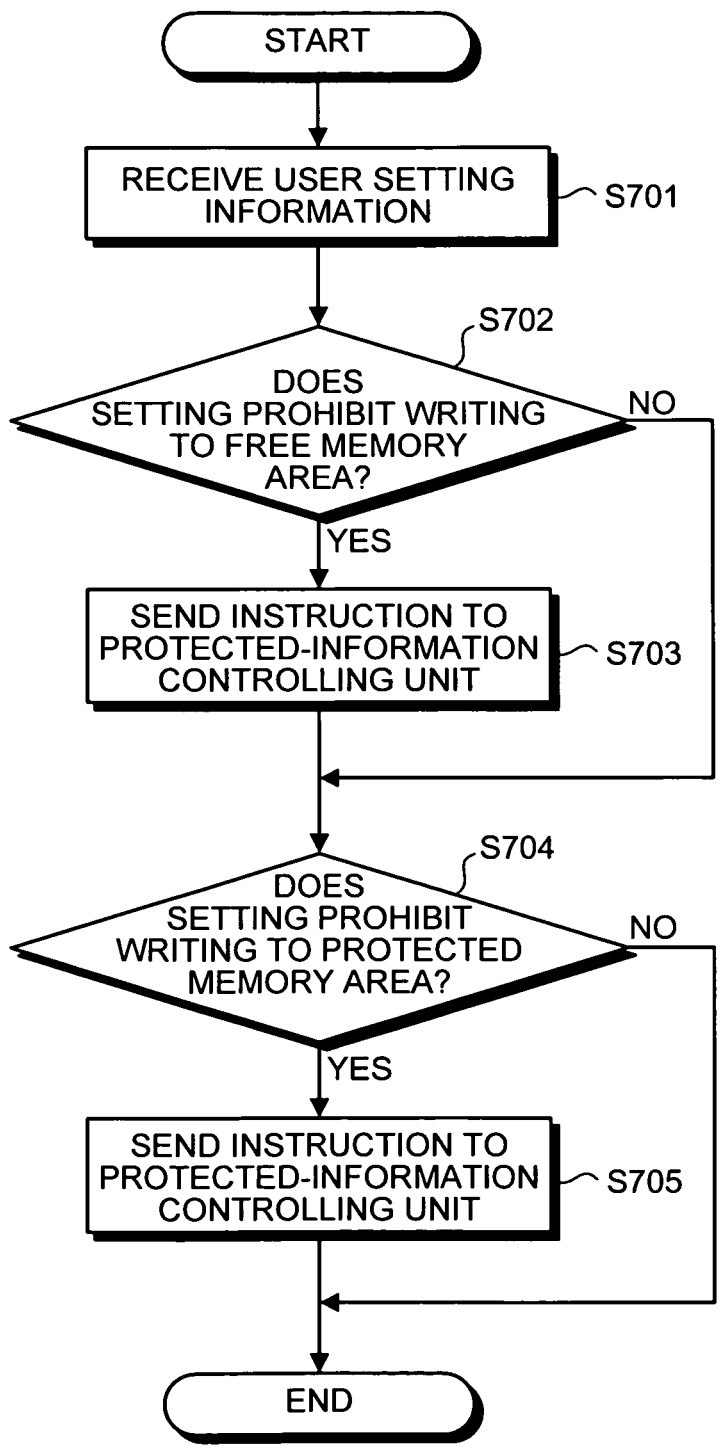
FIG. 20 is a flowchart of the provided-function setting process according to the third embodiment.

FIG. 20 is a flowchart of the provided-function setting process according to the third embodiment. As can be seen in FIG. 20, when user setting information is received (step S701), the provided-function setting unit 50d determines whether the setting prohibits writing to the free memory area 7 (step S702).

When the setting prohibits writing to the free memory area 7 (YES at step S702), the provided-function setting unit 50d instructs the protected-information controlling unit 50a to prohibit writing to the free memory area 7 (step s703). When there is no setting that prohibits writing to the free memory area 7 (NO at step S702), such instruction is not required.

Subsequently, the provided-function setting unit 50d determines whether the setting prohibits writing to the protected memory area 6 (step S704). When the setting prohibits writing to the protected memory area 6 (YES at step S704), the provided-function setting unit 50d instructs the protected-information controlling unit 50a to prohibit writing to the protected memory area 6 (step s705). When there is no setting that prohibits writing to the protected memory area 6 (NO at step S704), the process terminates without such instruction.

Although in the above description in connection with FIG. 20, the setting information includes information to prohibit writing to the free memory area 7 and the protected memory area 6, such information is cited merely by way of example and without limitation. The setting information can include information to prohibit reading from each memory area.

As described above, according to the third embodiment, the card-type recording device further includes the provided-function setting unit. Based on user setting information, the provided-function setting unit sends an instruction to the protected-information controlling unit, thereby limiting access to the protected memory area and the free memory area. Thus, in such cases as where a user lends his/her PC to another person or a plurality of users share the same PC, it is possible to effectively prevent authentication information for the PC from leaking to a malicious user.

In the first to third embodiments described above, authentication information such as a PIN is encrypted/decrypted with a key. The encrypted authentication information 51b is associated with a PC-ID when stored in the free memory area 7 (see, for example, FIG. 14), so that the smart card or card-type recording device 1 can be used on a plurality of PCs. However, depending on a method of generating this key, the same effect can be achieved without registration of the encrypted authentication information 51b and a PC-ID associated with each other.

FIG. 21 is a schematic illustrating an example of a key generation method. As shown in FIG. 21, when access authentication is performed while a card a is connected to the PC-A, a key (1) is generated using the PC-ID of the PC-A and the card ID of the card a as a seed. Authentication information is encrypted with the key (1), and the encrypted authentication information (1) is stored in the free memory area 7 of the card a.

After that, when a user connects the card a to a PC-B to operate the PC-B, a key (2) is generated using the PC-ID of the PC-B and the card ID of the card a as a seed for access authentication. As already described in connection with FIGS. 14 and 15, the PC-ID uniquely identifies a PC, while the card ID uniquely identifies a card-type recording device. Consequently, the key generated using these IDs as a seed varies according to the combination of the PC and the card-type recording device.

In this manner, when a key is generated using a PC-ID and a card ID as a seed and authentication information is encrypted with the key to obtain the encrypted authentication information 51b, the encrypted authentication information 51b can be decrypted only with the combination of the card-type recording device and the PC that performs the encryption.

Figure 22:
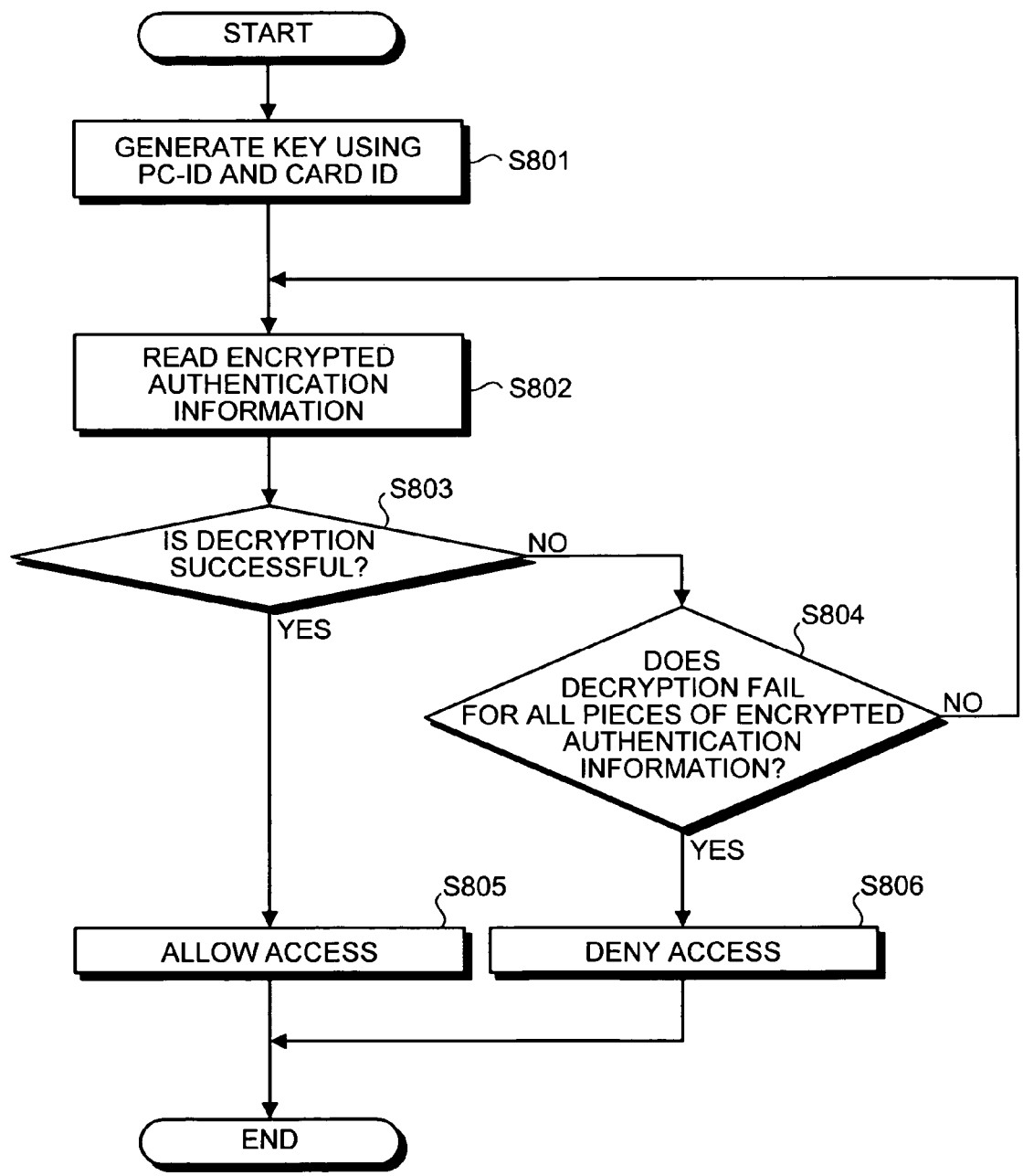
FIG. 22 is a flowchart of the decryption process using the key generation method shown in FIG. 21.

FIG. 22 is a flowchart of the decryption process using the key generation method shown in FIG. 21. When decryption is performed while the card-type recording device 1 is connected to the PC 2, a decryption key is generated using the PC-ID and card ID of them as a seed (step S801). The authentication processing unit 50c reads a piece of the encrypted authentication information 51b stored in the free memory area 7 (step S802), and determines whether the piece of the encrypted authentication information 51b is decrypted successfully (step S803).

If decryption is successful (YES at step S803), the authentication processing unit 50c informs the protected-information controlling unit 50a that access is granted to the protected memory area 6, and terminates the operation. On the other hand, if decryption fails (NO at step S803), the authentication processing unit 50c checks whether an unread piece of the encrypted authentication information 51b is still present in the free memory area 7. When all the pieces of the encrypted authentication information 51b are not decrypted successfully (YES at step S804), the authentication processing unit 50c informs the protected-information controlling unit 50a that access is denied to the protected memory area 6, and terminates the operation.

When an unread piece of the encrypted authentication information 51b is still present (NO at step S804), the process is repeated from step S802 until the encrypted authentication information 51b is decrypted successfully.

Incidentally, in the above embodiments, the encryption time and validity period, or the authentication time and validity period are stored. Based on the validity period, the expiration date and time until which an encrypted PIN or authentication is valid are obtained. The expiration date and time are compared to the current date and time to determine the validity of the encrypted PIN or the authentication. However, the expiration date and time can be stored in place of the validity period. In this case, the stored expiration date and time can be directly compared to the current date and time to determine the validity. Besides, when the expiration date and time are stored, the storing of the encryption time or the authentication time can be spared.

As set forth hereinabove, according to the embodiments of the present invention, from the second time onwards, authentication is performed by decrypting encrypted authentication information stored in a recording medium. Thereby, access authentication can be performed without forcing a user to enter the authentication information again. In addition, because the authentication information is encrypted, the authentication information is prevented from leaking even if the user loses the recording medium.

Besides, the recording medium can perform encryption and authentication. Thus, it is possible to reduce processing load on an information processing unit regardless of the type of the information processing unit.

In addition, a validity period is set for authentication information. With the validity period, the user can specify a period for which the information processing unit is available. Thus, when the user lends the information processing unit to another person, he/she can manage the available period of the information processing unit.

Further, a plurality of pieces of encrypted authentication information can be stored in the recording medium. Therefore, the recording medium can be used on a plurality of information processing units.

Still further, authentication information is encrypted and decrypted by using a key that is uniquely defined according to a combination of a recording medium and an information processing unit. Information that has not been encrypted is not stored in the recording medium or the information processing unit. Thereby, the security can be enhanced.

Although the invention has been described with respect to a specific embodiment for a complete and clear disclosure, the appended claims are not to be thus limited but are to be construed as embodying all modifications and alternative constructions that may occur to one skilled in the art that fairly fall within the basic teaching herein set forth.

What is claimed is:

1. An access authentication method for performing access authentication using a recording medium that is detachably connected to an information processing unit, the access authentication method comprising:

first performing the access authentication by authenticating authentication information provided by a user;

issuing a key corresponding to the authentication information, when the access authentication based on the authentication information is successful at the first performing;

encrypting the authentication information provided by the user with the key to generate encrypted authentication information; and first storing the key in the information processing unit;

second storing, using a processor, the encrypted authentication information in a first memory area of the recording medium, and a plurality of identification information of login screens for a plurality of systems and respective login information about the login screens, in a corresponding manner, the login information being used to log in the respective login screens and including both an identification information (ID) and a password in a second memory area of the recording medium, the second memory area being protected by the authentication information provided by the user;

second performing, using the processor, the access authentication by obtaining the encrypted authentication information stored in the first memory area of the recording medium at the storing and by decrypting the encrypted authentication information using the key stored in the information processing unit at the storing, when a login screen for a system is displayed on the information processing unit;

reading, using the processor, login information including both an ID and a password corresponding to identification information of the displayed login screen from the second memory area, when the access authentication is successful at the second performing; and entering, using the processor, the login information read at the reading on the displayed login screen, wherein the issuing, the encrypting, the first storing, and the second storing are performed in a first event in which the recording medium is connected to the information processing unit, and the second performing, the reading, and the entering are performed in a second event after the first event in which the recording medium is connected to the information processing unit.

2. The access authentication method according to claim 1, wherein the information processing unit performs the first performing, the issuing, the encrypting, the first storing, the second storing the second performing, the reading and the entering.

3. The access authentication method according to claim 1, wherein the recording medium performs the first performing, the issuing, the encrypting, the first storing, the second storing the second performing, the reading and the entering.

4. The access authentication method according to claim 1, further comprising setting a validity period for the key used for at least one of the encrypting and the second performing, wherein the second performing is performed when the validity period is not expired.

5. The access authentication method according to claim 1, wherein, at the encrypting, encrypted authentication information is generated and stored in the recording medium each time access authentication based on authentication information from the user is successful at the first performing, and at the second performing, when a plurality of pieces of encrypted authentication information are stored in the recording medium, any one of the pieces of encrypted authentication information is decrypted using the key stored in the information processing unit.

6. The access authentication method according to claim 5, wherein, at the encrypting, encrypted authentication information is associated with unit identification information to uniquely identify an information processing unit that is involved in generating the encrypted authentication information, and the associated information is stored in the recording medium, and at the second performing, encrypted authentication information associated with unit identification information corresponding to an information processing unit to which the recording medium is currently connected is obtained from the plurality of pieces of encrypted authentication information stored in the recording medium, and the decryption is performed.

7. The access authentication method according to claim 1, further comprising determining whether to generate the encrypted authentication information, wherein, at the encrypting, the encrypted authentication information is generated when the encrypted authentication information has been determined to be generated.

8. The access authentication method according to claim 1, further comprising determining whether to use the encrypted authentication information stored in the recording medium, wherein, at the second performing, the decryption is performed using the encrypted authentication information when the encrypted authentication information has been determined to be used.

9. The access authentication method according to claim 1, further comprising storing in the recording medium unit identification information to uniquely identify an information processing unit that is involved in generating encrypted authentication information when the encrypted authentication information generated at the encrypting is stored in the recording medium, wherein, at the second performing, the decryption is performed when unit identification information corresponding to an information processing unit to which the recording medium is currently connected matches the unit identification information stored in the recording medium.

10. The access authentication method according to claim 1, further comprising storing medium identification information to uniquely identify a recording medium in an information processing unit that is involved in generating encrypted authentication information when the encrypted authentication information generated at the encrypting is stored in the recording medium, wherein, at the second performing, the decryption is performed when medium identification information corresponding to a recording medium which is currently connected to the information processing unit matches the medium identification information stored in the information processing unit.

11. The access authentication method according to claim 1, wherein, at the encrypting, the predetermined key is issued for the encryption based on medium identification information to uniquely identify a recording medium and unit identification information to uniquely identify an information processing unit to which the recording medium is currently connected, and at the second performing, the key is issued for the decryption based on medium identification information corresponding to the recording medium and unit identification information corresponding to an information processing unit to which the recording medium is currently connected.

12. A computer-readable non-transitory recording medium that stores therein an access authentication program for implementing an access authentication method in which access authentication is performed by an information processing unit being a computer with a recording medium that is detachably connected to the information processing unit, the access authentication program causing the computer to perform a process comprising:

first performing the access authentication by authenticating authentication information provided by a user;

issuing a key corresponding to the authentication information, when the access authentication based on the authentication information is successful at the first performing;

encrypting the authentication information provided by the user with the key to generate encrypted authentication information; and storing the key in the information processing unit, the encrypted authentication information in a first memory area of the recording medium, and a plurality of identification information of login screens for a plurality of systems and respective login information about the login screens, in a corresponding manner, the login information being used to log in the respective login screens and including both an identification information (ID) and a password in a second memory area of the recording medium, the second memory area being protected by the authentication information provided by the user;

second performing the access authentication by obtaining the encrypted authentication information stored in the first memory area of the recording medium at the storing and by decrypting the encrypted authentication information using the key stored in the information processing unit at the storing, when a login screen for a system is displayed on the information processing unit;

reading login information including both an ID and a password corresponding to identification information of the displayed login screen from the second memory area, when the access authentication is successful at the second performing; and entering the login information read at the reading on the displayed login screen, wherein the issuing, the encrypting, and the storing are performed in a first event in which the recording medium is connected to the information processing unit, and the second performing, the reading, and the entering are performed in a second event after the first event in which the recording medium is connected to the information processing unit.

13. The computer-readable recording medium according to claim 12, the program further causing the computer to perform setting a validity period for the key used for at least one of the encrypting and the second performing, wherein the second performing is performed when the validity period is not expired.

14. The computer-readable recording medium according to claim 12, wherein, at the encrypting, encrypted authentication information is generated and stored in the recording medium each time access authentication based on authentication information from the user is successful at the first performing, and at the second performing, when a plurality of pieces of encrypted authentication information are stored in the recording medium, any one of the pieces of encrypted authentication information is decrypted using the key in the information processing unit.

15. The computer-readable recording medium according to claim 14, wherein, at the encrypting, encrypted authentication information is associated with unit identification information to uniquely identify an information processing unit that is involved in generating the encrypted authentication information, and the associated information is stored in the recording medium, and at the second performing, encrypted authentication information associated with unit identification information corresponding to an information processing unit to which the recording medium is currently connected is obtained from the plurality of pieces of encrypted authentication information stored in the recording medium, and the decryption is performed.

16. The computer-readable recording medium according to claim 12, the program further causing the computer to perform determining whether to generate the encrypted authentication information, wherein, at the encrypting, the encrypted authentication information is generated when the encrypted authentication information has been determined to be generated.

17. The computer-readable recording medium according to claim 12, the program further causing the computer to perform determining whether to use the encrypted authentication information stored in the recording medium, wherein, at the second performing, the decryption is performed using the encrypted authentication information when the encrypted authentication information has been determined to be used.

18. The computer-readable recording medium according to claim 12, the program further causing the computer to perform storing in the recording medium unit identification information to uniquely identify an information processing unit that is involved in generating encrypted authentication information when the encrypted authentication information generated at the encrypting is stored in the recording medium, wherein, at the second performing, the decryption is performed when unit identification information corresponding to an information processing unit to which the recording medium is currently connected matches the unit identification information stored in the recording medium.

19. The computer-readable recording medium according to claim 12, the program further causing the computer to perform storing medium identification information to uniquely identify a recording medium in an information processing unit that is involved in generating encrypted authentication information when the encrypted authentication information generated at the encrypting is stored in the recording medium, wherein, at the second performing, the decryption is performed when medium identification information corresponding to a recording medium which is currently connected to the information processing unit matches the medium identification information stored in the information processing unit.

20. A computer-readable non-transitory recording medium that stores therein an access authentication program for implementing an access authentication method in which access authentication is performed by a recording medium being a computer that is detachably connected to an information processing unit with authentication information provided by a user, the access authentication program causing the computer to perform a process comprising:

first performing the access authentication by authenticating authentication information provided by a user;

issuing a key corresponding to the authentication information, when the access authentication based on the authentication information is successful at the first performing;

encrypting the authentication information provided by the user with the key to generate encrypted authentication information; and storing the key in the information processing unit, the encrypted authentication information in a first memory area of the recording medium, and a plurality of identification information of login screens for a plurality of systems and respective login information about the login screens, in a corresponding manner, the login information being used to log in the respective login screens including both an identification information (ID) and a password in a second memory area of the recording medium, the second memory area being protected by the authentication information provided by the user;

second performing the access authentication by obtaining the encrypted authentication information stored in the first memory area of the recording medium at the storing and by decrypting the encrypted authentication information using the key stored in the information processing unit at the storing, when a login screen for a system is displayed on the information processing unit;

reading login information including both an ID and a password corresponding to identification information of the displayed login screen from the second memory area, when the access authentication is successful at the second performing; and entering the login information read at the reading on the displayed login screen, wherein the issuing, the encrypting, and the storing are performed in a first event in which the recording medium is connected to the information processing unit, and the second performing, the reading, and the entering are performed in a second event after the first event in which the recording medium is connected to the information processing unit.

21. The computer-readable recording medium according to claim 20, the program further causing the computer to perform setting a validity period for the key used for at least one of the encrypting and the second performing, wherein the second performing is performed when the validity period is not expired.

22. The computer-readable recording medium according to claim 20, wherein, at the encrypting, encrypted authentication information is generated and stored in the recording medium each time access authentication based on authentication information from the user is successful at the first performing, and at the second performing, when a plurality of pieces of encrypted authentication information are stored in the recording medium, any one of the pieces of encrypted authentication information is decrypted using the key in the information processing unit.

23. The computer-readable recording medium according to claim 22, wherein, at the encrypting, encrypted authentication information is associated with unit identification information to uniquely identify an information processing unit that is involved in generating the encrypted authentication information, and the associated information is stored in the recording medium, and at the second performing, encrypted authentication information associated with unit identification information corresponding to an information processing unit to which the recording medium is currently connected is obtained from the plurality of pieces of encrypted authentication information stored in the recording medium, and the decryption is performed.

24. The computer-readable recording medium according to claim 20, the program further causing the computer to perform determining whether to generate the encrypted authentication information, wherein, at the encrypting, the encrypted authentication information is generated when the encrypted authentication information has been determined to be generated.

25. The computer-readable recording medium according to claim 20, the program further causing the computer to perform determining whether to use the encrypted authentication information stored in the recording medium, wherein, at the second performing, the decryption is performed using the encrypted authentication information when the encrypted authentication information has been determined to be used.

26. The computer-readable recording medium according to claim 20, the program further causing the computer to perform storing in the recording medium unit identification information to uniquely identify an information processing unit that is involved in generating encrypted authentication information when the encrypted authentication information generated at the encrypting is stored in the recording medium, wherein, at the second performing, the decryption is performed when unit identification information corresponding to an information processing unit to which the recording medium is currently connected matches the unit identification information stored in the recording medium.

27. The computer-readable recording medium according to claim 20, the program further causing the computer to perform storing medium identification information to uniquely identify a recording medium in an information processing unit that is involved in generating encrypted authentication information when the encrypted authentication information generated at the encrypting is stored in the recording medium, wherein, at the second performing, the decryption is performed when medium identification information corresponding to a recording medium which is currently connected to the information processing unit matches the medium identification information stored in the information processing unit.

28. An information processing apparatus for performing access authentication using a recording medium that is detachably connected thereto and authentication information provided by a user, the information processing apparatus comprising:

a first performing unit that performs the access authentication by authenticating authentication information provided by a user;

an issuing unit that issues a key corresponding to the authentication information, when the access authentication based on the authentication information performed by the first performing unit is successful;

an encrypting unit that encrypts the authentication information provided by the user with the key to generate encrypted authentication information;

a storing unit that stores the key in the information processing unit, the encrypted authentication information in a first memory area of the recording medium, and a plurality of identification information of login screens for a plurality of systems and respective login information about the login screens, in a corresponding manner, the login information being used to log in the respective login screens and including both an identification information (ID) and a password in a second memory area of the recording medium, the second memory area being protected by the authentication information provided by the user; and a second performing unit that performs the access authentication by obtaining the encrypted authentication information stored in the first memory area of the recording medium at the storing and by decrypting the encrypted authentication information using the key stored in the information processing unit by the storing unit, when a login screen for a system is displayed on the information processing unit; wherein the second performing unit reads login information including both an ID and a password corresponding to identification information of the displayed login screen from the second memory area, when the access authentication is successful by the second performing unit, and enters the read login information on the displayed login screen, the issuing by the issuing unit, the encrypting by the encrypting unit, and the storing by storing unit are performed in a first event in which the recording medium is connected to the information processing unit, and the second performing by the second performing unit, the reading by the second performing unit, and the entering by the second performing unit are performed in a second event after the first event in which the recording medium is connected to the information processing unit.

29. An information processing unit for performing access authentication using a recording medium that is detachably connected thereto and authentication information provided by a user, the information processing unit comprising:

a memory; and a processor coupled to the memory, wherein the processor executes a process comprising:

first performing the access authentication by authenticating authentication information provided by a user;

issuing a key corresponding to the authentication information, when the access authentication based on the authentication information is successful at the first performing;

encrypting the authentication information provided by the user with the key to generate encrypted authentication information;

storing the key in the information processing unit, the encrypted authentication information in a first memory area of the recording medium, and a plurality of identification information of login screens for a plurality of systems and respective login information about the login screens, in a corresponding manner, the login information being used to log in the respective login screens and including both an identification information (ID) and a password in a second memory area of the recording medium, the second memory area being protected by the authentication information provided by the user;

second performing the access authentication by obtaining the encrypted authentication information stored in the first memory area of the recording medium at the storing and by decrypting the encrypted authentication information using the key stored in the information processing unit at the storing, when a login screen for a system is displayed on the information processing unit;

reading login information including both an ID and a password corresponding to identification information of the displayed login screen from the second memory area, when the access authentication is successful at the second performing; and entering the login information at the reading on the displayed login screen, wherein the issuing, the encrypting, and the storing are performed in a first event in which the recording medium is connected to the information processing unit, and the second performing, the reading, and the entering are performed in a second event after the first event in which the recording medium is connected to the information processing unit.

* * * * *